(12) United States Patent
Hotta

(10) Patent No.: US 11,362,560 B2
(45) Date of Patent: Jun. 14, 2022

(54) STATOR

(71) Applicant: DENSO CORPORATION, Kariya (JP)

(72) Inventor: Koji Hotta, Kariya (JP)

(73) Assignee: DENSO CORPORATION, Kariya (JP)

( * ) Notice: Subject to any disclaimer, the term of this patent is extended or adjusted under 35 U.S.C. 154(b) by 181 days.

(21) Appl. No.: 16/752,987

(22) Filed: Jan. 27, 2020

(65) Prior Publication Data
US 2020/0259389 A1 Aug. 13, 2020

(30) Foreign Application Priority Data

Feb. 8, 2019 (JP) .............................. JP2019-021498

(51) Int. Cl.
*H02K 3/52* (2006.01)

(52) U.S. Cl.
CPC .................... *H02K 3/522* (2013.01)

(58) Field of Classification Search
CPC ....................................................... H02K 3/522
See application file for complete search history.

(56) References Cited

U.S. PATENT DOCUMENTS

| 7,262,529 | B2 * | 8/2007 | Klappenbach | H02K 3/522 |
| | | | | 310/71 |
| 7,560,839 | B2 * | 7/2009 | Sumiya | F02M 37/048 |
| | | | | 310/43 |
| 9,178,397 | B2 * | 11/2015 | Furuhashi | H02K 3/522 |
| 9,385,568 | B2 * | 7/2016 | Kodani | H02K 3/345 |
| 10,069,351 | B2 * | 9/2018 | Kageme | H02K 21/22 |
| 10,396,613 | B2 * | 8/2019 | Kanda | H02K 1/148 |
| 2011/0234031 | A1 | 9/2011 | Kato | |
| 2016/0079822 | A1 * | 3/2016 | Noguchi | F04D 13/06 |
| | | | | 310/71 |
| 2016/0218579 | A1 * | 7/2016 | Peng | H02K 21/24 |
| 2017/0366059 | A1 * | 12/2017 | Iizuka | H02K 3/30 |
| 2020/0014288 | A1 | 1/2020 | Hotta et al. | |
| 2020/0018300 | A1 * | 1/2020 | Guntermann | H02K 3/345 |
| 2020/0259387 | A1 * | 8/2020 | Hotta | H02K 5/225 |

(Continued)

FOREIGN PATENT DOCUMENTS

| JP | 2011-205817 A | 10/2011 |
| JP | 2015-192542 | 11/2015 |
| JP | 6118152 B2 | 3/2017 |

OTHER PUBLICATIONS

U.S. Appl. No. 16/752,962, filed Jan. 27, 2020, Jan. 27, 2020, Koji Hotta.

(Continued)

*Primary Examiner* — Robert W Horn
(74) *Attorney, Agent, or Firm* — Maschoff Brennan

(57) ABSTRACT

In a stator, coils of multiple phases are wound around a stator core via an insulator. A guide member is provided on one side of the stator core in the axial direction and guides the terminal line of the coil in the circumferential direction at a position overlapping the coil in the axial direction. The guide member has a collecting portion which collect the terminal lines at one place in the circumferential direction. The terminal line of the coil arranged in a vicinity of the collecting portion in the terminal line is a non-drawn terminal wire that is collected in the collecting portion without being drawn on the guide member in the circumferential direction.

4 Claims, 19 Drawing Sheets

(56) References Cited

U.S. PATENT DOCUMENTS

2020/0259388 A1\* 8/2020 Hotta .................... H02K 5/225

OTHER PUBLICATIONS

U.S. Appl. No. 16/752,976, filed Jan. 27, 2020, Jan. 27, 2020, Koji Hotta.
U.S. Appl. No. 16/752,973, filed Jan. 27, 2020, Jan. 27, 2020, Koji Hotta.
U.S. Appl. No. 16/773,015, filed Jan. 27, 2020, Jan. 27, 2020, Koji Hotta.

\* cited by examiner

STATOR

CROSS REFERENCE TO RELATED APPLICATION

The present application is based on Japanese Patent Application No. 2019-21498 filed on Feb. 8, 2019, the disclosure of which is incorporated herein by reference.

TECHNICAL FIELD

The present disclosure relates to a stator.

BACKGROUND

Conventionally, as a stator of a motor, multi phase windings are wound on a stator core via an insulator.

SUMMARY

An object of the present disclosure is to provide the stator that may suppress an increase in the radial direction.

In the stator, coils of multiple phases are wound around a stator core via an insulator. A guide member is provided on one side of the stator core in an axial direction and guides a terminal line of the coil in a circumferential direction at a position overlapping the coil in the axial direction. The guide member has a collecting portion which collect the terminal lines at one place in the circumferential direction. The terminal line of a coil arranged in the vicinity of the collecting portion in the terminal line is a non-drawn terminal wire that is collected in the collecting portion without being drawn on the guide member in the circumferential direction.

DETAILED DESCRIPTION

Figure 1:
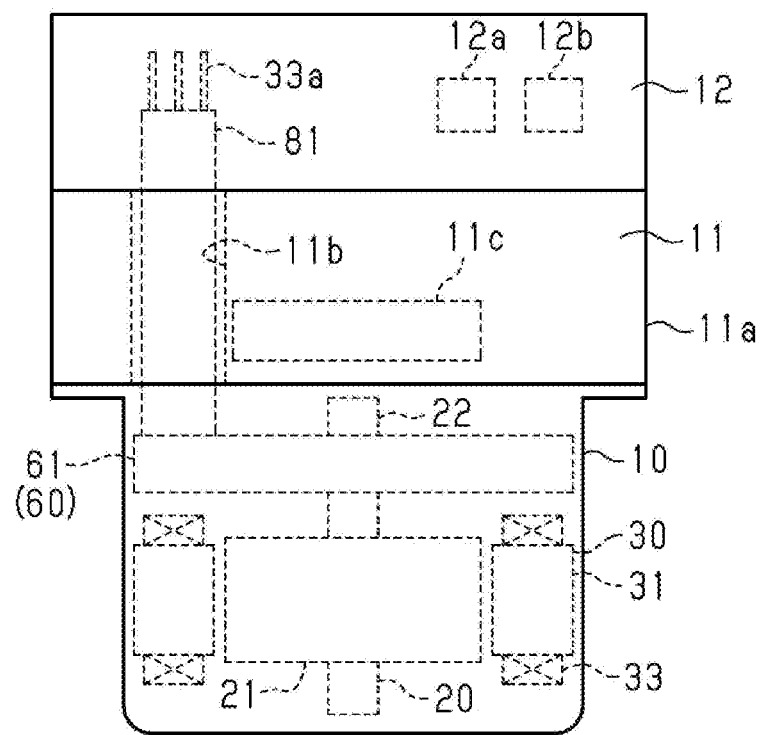
FIG. 1 is a schematic configuration diagram of an electric brake system including a motor according to an embodiment.

Hereinafter, an embodiment of a motor including a stator will be described with reference to the drawings. In the drawings, for convenience of explanation, part of the configuration may be shown exaggerated or simplified. In addition, the dimensional ratio of each part may be different from the actual one.

As shown in FIG. 1, a motor 10 is used for an electric brake system. The electric brake system includes a hydro unit 11 that adjusts a hydraulic pressure of a brake fluid, the motor 10 that is connected to the hydro unit 11 and drives the hydro unit 11, and an EDU (ELECTRIC DRIVER UNIT) 12 that controls a drive of the motor 10. In the brake system of the present embodiment, the hydro unit 11 is interposed between the EDU 12 and the motor 10. The motor 10 and the EDU 12 are electrically connected through a through hole 11b provided in a housing 11a of the hydro unit 11.

The motor 10 of the present embodiment includes a rotor 20 and a stator 30. As shown in FIG. 1, the rotor 20 has a rotor core 21, magnets (not shown) provided on the rotor core 21, and a rotation shaft 22 provided at the radial center of the rotor core 21. One end in the axial direction of the rotation shaft 22 is directly or indirectly connected to a gear 11c in the hydro unit 11. As a result, when the rotation shaft 22 is rotationally driven, the gear 11c in the hydro unit 11 is driven to adjust the hydraulic pressure of the brake fluid.

Figure 2:
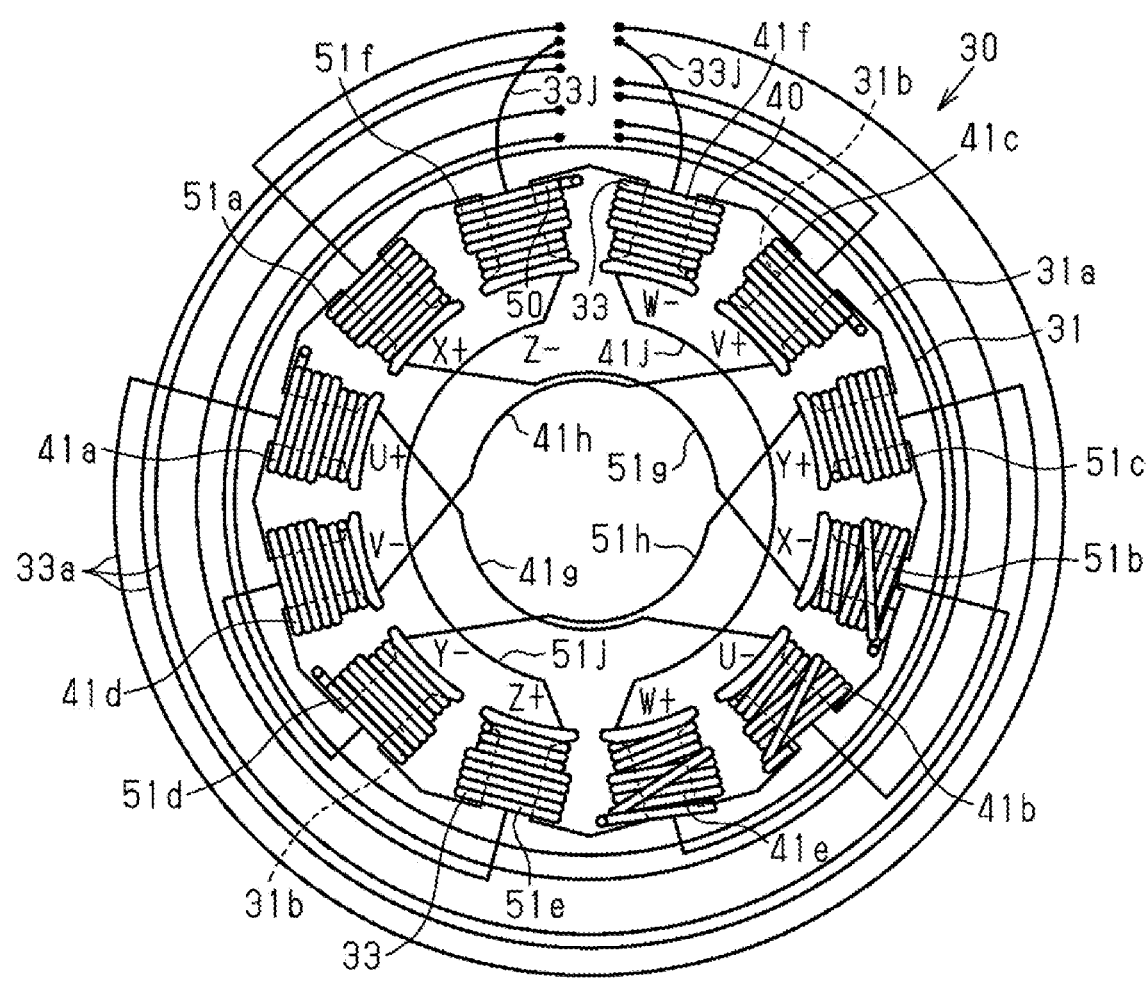
FIG. 2 is a plan view of a stator showing a state in which a guide member in the embodiment is removed.
Figure 3:
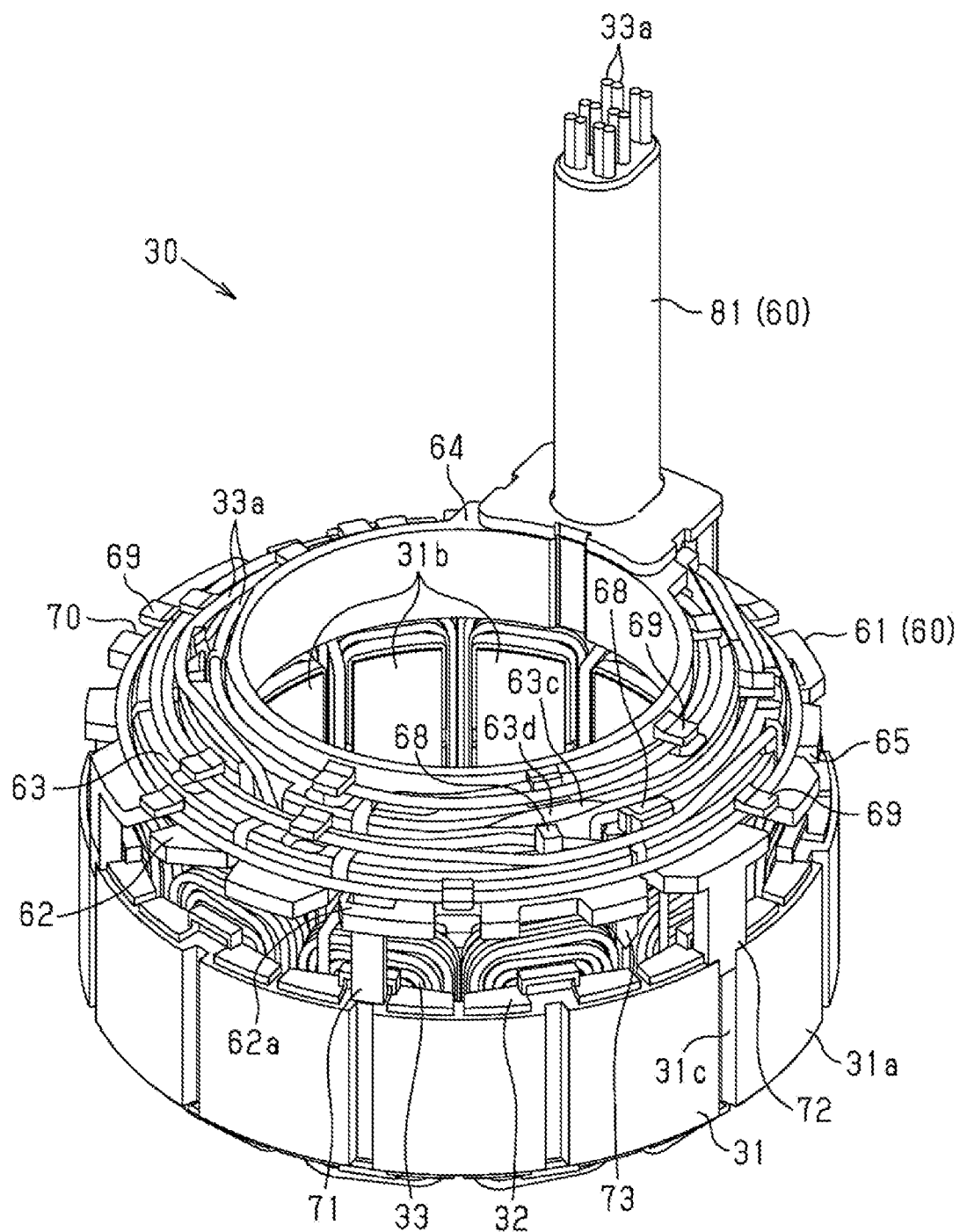
FIG. 3 is a perspective view of the stator in the embodiment.
Figure 4:
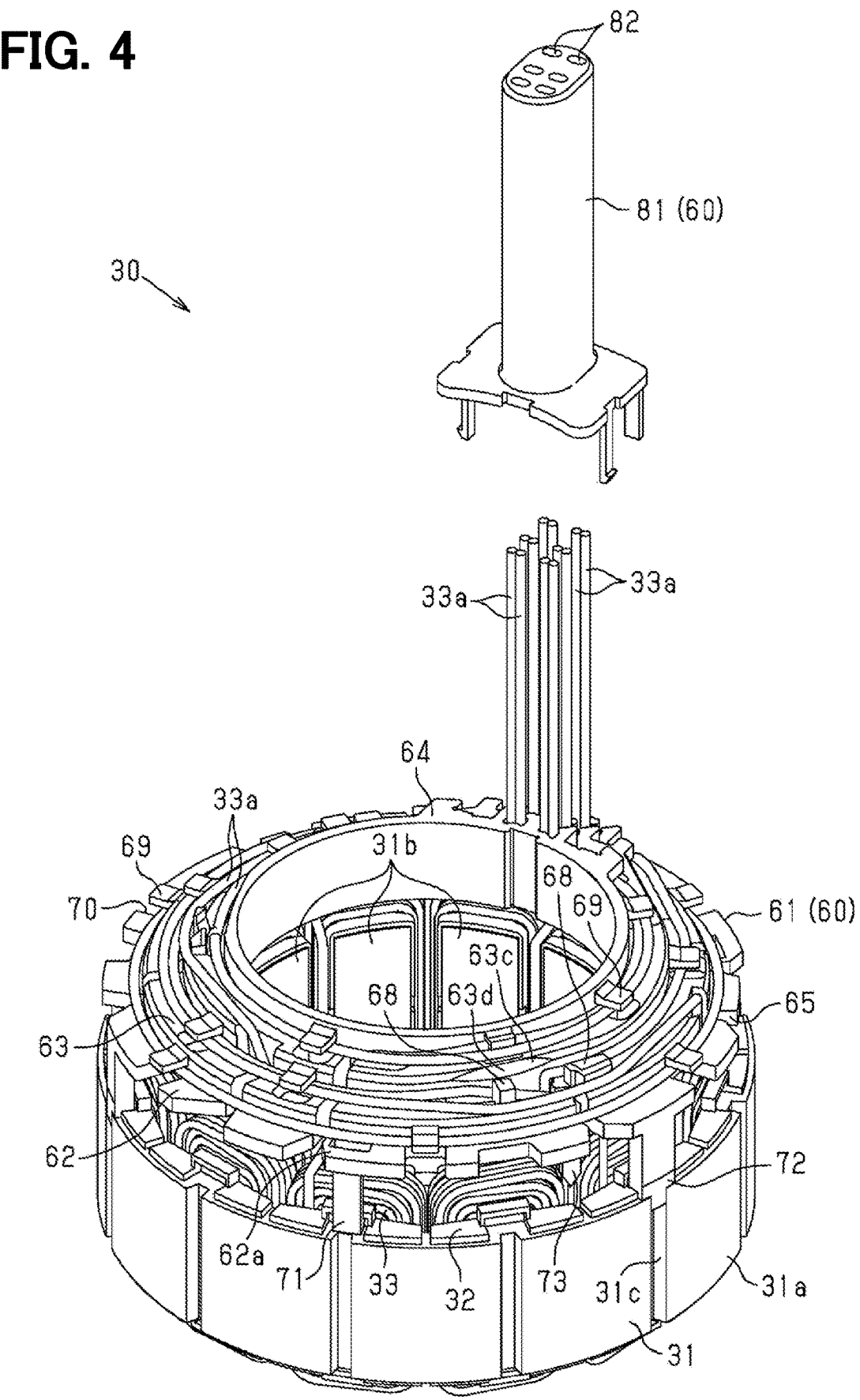
FIG. 4 is an exploded perspective view of the stator in the embodiment.

As shown in FIGS. 2 to 4, the stator 30 includes a stator core 31, an insulator 32 (not shown in FIG. 2) of the stator core 31, and coils 33.

The stator core 31 has a substantially annular portion 31a and a plurality of teeth 31b extending radially inward from the annular portion 31a. In the present embodiment, for example, twelve teeth 31b are provided. The coils 33 are wound around each of teeth 31b with the insulator 32 located in therebetween. The coils 33 are wound in, for example, a concentrated manner.

The coils 33 include a first three-phase winding 40 which is electrically connected to a first inverter circuit 12a provided in the EDU 12, and a second three-phase winding 50 which is electrically connected to a second inverter circuit 12b provided in the EDU 12. That is, in the present embodiment, first and second inverter circuits 12a and 12b constituting two systems (plurality of systems) in EDU 12 are provided, and the first and second inverter circuits 12a and 12b are supplied current to each of the three-phase windings 40 and 50.

As shown in FIG. 2, the first three-phase winding 40 has a plurality of three-phase windings 41a to 41f to which a three-phase alternating current having a phase difference of 120 degrees is supplied from the first inverter circuit 12a. The plurality of three-phase windings 41a to 41f includes U+phase winding 41a, U−phase winding 41b, V+phase winding 41c, V−phase winding 41d, W+phase winding 41e, and W−phase winding 41f.

As shown in FIG. 2, the second three-phase winding 50 has a plurality of three-phase windings 51a to 51f to which a three-phase alternating current having a phase difference of 120 degrees is supplied from the second inverter circuit 12b. The plurality of three-phase windings 51a to 51f include X+phase winding 51a, X−phase winding 51b, Y+phase winding 51c, Y−phase winding 51d, Z+phase winding 51e, and Z−phase winding 51f.

The coils 33 of the present embodiment are wound, for example, in the order of W−phase winding 41f, V+phase winding 41c, Y+phase winding 51c, X−phase winding 51b, U−phase winding 41b, W+phase winding 41e, Z+phase winding 51e, Y−phase winding 51d, V−phase winding 41d, U+phase winding 41a, X+phase winding 51a, Z−phase winding 51f, for each tooth 31b.

Here, the winding direction of the U+phase winding 41a wound around the teeth 31b is opposite to the winding direction of the U−phase winding 41b wound around the teeth 31b. The winding direction of the V+phase winding 41c wound around the teeth 31b is opposite to the winding direction of the V−phase winding 41d wound around the teeth 31b. Further, the winding direction of the W+phase winding 41e wound around the teeth 31b is opposite to the winding direction of the W−phase winding 41f wound around the teeth 31b. The teeth 31b around which the U+phase winding 41a is wound and the teeth 31b around which the U−phase winding 41b is wound are provided at positions different from each other by 150 degrees in the circumferential direction. The teeth 31b around which the V+phase winding 41c is wound and the teeth 31b around which the V−phase winding 41d is wound are provided at positions different by 150 degrees in the circumferential direction. The teeth 31b around the W+phase winding 41e is wound and the teeth 31b around the W−phase winding 41f is wound are provided at positions different by 150 degrees in the circumferential direction.

The winding direction of the X+phase winding 51a wound around the teeth 31b is opposite to the winding direction of the X−phase winding 51b wound around the teeth 31b. The winding direction of the Y+phase winding 51c wound around the teeth 31b is opposite to the winding direction of the Y−phase winding 51d wound around the teeth 31b. Further, the winding direction of the Z+phase winding 51e wound around the teeth 31b is opposite to the winding direction of the Z−phase winding 51f wound around the teeth 31b. The teeth 31b around the X+phase winding 51a is wound and the teeth 31b around the X−phase winding 51b is wound are provided at positions different by 150 degrees in the circumferential direction. The teeth 31b around which the Y+phase winding 51c is wound and the teeth 31b around which the Y−phase winding 51d is wound are provided at positions different by 150 degrees in the circumferential direction. The teeth 31b around the Z+phase winding 51e is wound and the teeth 31b around the Z−phase winding 51f is wound are provided at positions different by 150 degrees in the circumferential direction.

The U+phase winding 41a and the U−phase winding 41b are connected by a jumper wire 41g. The V+phase winding 41c and the V−phase winding 41d are connected by a jumper wire 41h. The W+phase winding 41e and the W−phase winding 41f are connected by a jumper wire 41j. The X+phase winding 51a and the X−phase winding 51b are connected by a jumper wire 51g. The Y+phase winding 51c and the Y−phase winding 51d are connected by a jumper wire 51h. The Z+phase winding 51e and the Z−phase winding 51f are connected by a jumper wire 51j. The jumper wires 41g, 41h, 41j, 51g, 51h, 51j are provided on the other end side in the axial direction of the stator core 31 and on the side not facing the hydro unit 11 (lower side in FIG. 1). As shown in FIG. 2, those jumper wires are provided by being guided by a guide portion (not shown) provided on the insulator 32 and a guide member (not shown) fixed to the stator core 31. The jumper wire 41j connecting the W+phase winding 41e and the W−phase winding 41f and the jumper wire 51j connecting the Z+phase winding 51e and the Z−phase winding 51f are routed outward in the radial direction with respect to the other jumper wires 41g, 41h, 51g, 51h, and thus are longer than the other jumper wires 41g, 41h, 51g, 51h.

The first three-phase winding 40 of the present embodiment is connected to the first inverter circuit 12a by a delta connection. The second three-phase winding 50 is connected to the second inverter circuit 12b by a delta connection.

More specifically, a terminal line 33a of the U+phase winding 41a is connected to an U terminal of the first inverter circuit 12a together with a terminal line 33a of the W−phase winding 41f. A terminal line 33a of the U−phase winding 41b is connected to a V terminal of the first inverter circuit 12a together with a terminal line 33a of the V+phase winding 41c. A terminal line 33a of the W+phase winding 41e is connected to a W terminal of the first inverter circuit 12a together with a terminal line 33a of the V−phase winding 41d.

A terminal line 33a of the X+phase winding 51a is connected to a X terminal of the second inverter circuit 12b together with a terminal line 33a of the Z−phase winding 51f. A terminal line 33a of the X−phase winding 51b is connected to a Y terminal of the second inverter circuit 12b together with a terminal line 33a of the Y+phase winding 51c. A terminal line 33a of the Z+phase winding 51e is connected to a Z terminal of the second inverter circuit 12b together with a terminal line 33a of the Y−phase winding 51d. In addition, the jumper wires 41g, 41h, 41j, 51g, 51h, 51j connect the ends of the coil 33 on the opposite side to the above terminal line 33a for each phase.

As shown in FIG. 1, in the stator 30, a guide member 60 is provided on the side of the hydro unit 11, which is one side in the axial direction of the stator core 31.

The guide member 60 guides the terminal lines 33a of the coils 33 in the circumferential direction at a position overlapping the coils 33 in the axial direction, and further guides them to the EDU 12. The guide member 60 includes a guide body 61 and a pullout guide 81 for pulling out.

Figure 5:
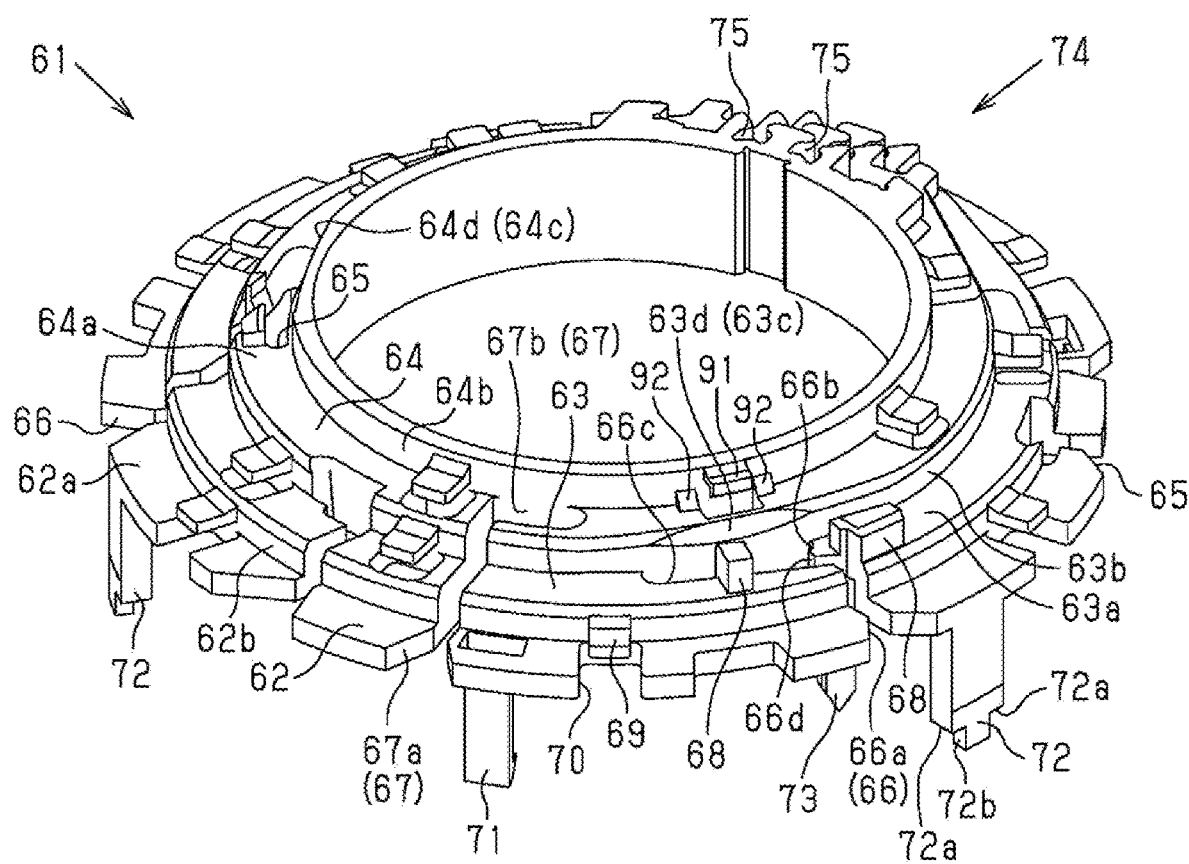
FIG. 5 is a perspective view of a guide body in the embodiment.
Figure 6:
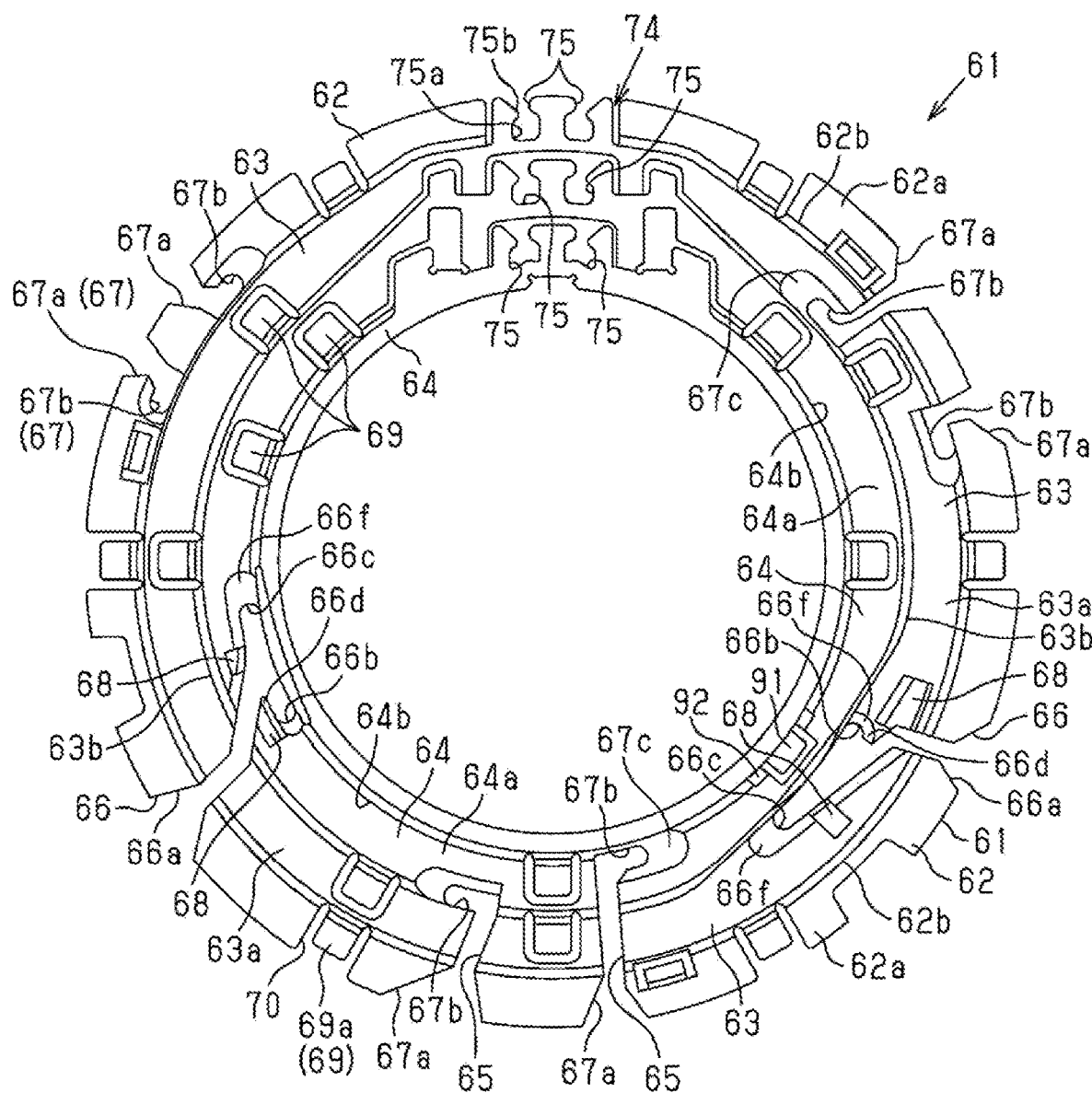
FIG. 6 is a plan view of the guide body in the embodiment.

As shown in FIGS. 5 and 6, the guide body 61 has a lower step portion 62 as a plurality of step portions, a middle step portion 63, and an upper step portion 64 so as to form a three-step shape.

The lower step portion 62 includes a bottom part 62a that extends in the radial direction and faces in the axial direction, and a step part 62b that extends in the axial direction from a radially inner side of the bottom part 62a and faces in the radial direction.

The middle step portion 63 includes a bottom part 63a which extends in the radial direction and faces in the axial direction, and a step part 63b which extends in the axial direction from a radially inner side of the bottom part 63a and faces in the radial direction. The bottom part 63a extends radially inward from a tip in the axial direction of the step part 62b.

The upper step portion 64 includes a bottom part 64a which extends in the radial direction and faces in the axial direction, and a step part 64b which is a wall surface extending in the axial direction from a radially inner side of the bottom part 64a and facing in the radial direction. The bottom part 64a extends radially inward from an end in the axial direction of the step part 63b.

The lower step portion 62 is located closer to the stator core 31 than the middle step portion 63 and the upper step portion 64 in the axial direction in a state where the guide body 61 is attached to one side of the stator core 31 in the axial direction. The middle step portion 63 is located between the lower step portion 62 and the upper step portion 64. The upper step portion 64 is located closer on the side opposite to the stator core 31 with respect to the lower step portion 62 and the middle step portion 63 in the axial direction in a state where the guide body 61 is attached to one side in the axial direction of the stator core 31. The lower step portion 62 is located on the radially outer side with respect to the middle step portion 63 and the upper step portion 64. The upper step portion 64 is located radially inward with respect to the lower step portion 62 and the middle step portion 63. That is, the guide body 61 of the present embodiment is spaced apart from the stator core 31 in the axial direction in order from the lower step portion 62 on the radially outer side, and the outer diameter of the guide body 61 becomes smaller (that is, the diameter is decreased). In other words, the guide body 61 has the lower step portion 62, the middle step portion 63, and the upper step portion 64 so as to reduce the diameter in the axial direction toward the side opposite to the stator core 31.

The guide body 61 includes a plurality of notches 65 penetrating in the axial direction so that the terminal lines 33a of the coil 33 penetrates from the outer side in the radial direction to the inner side in the radial direction. In other words, the guide body 61 has a notch 65. When a distal end of the terminal line 33a which is drawn radially outward at the other axial end side of the guide body 61 is moved to one side in the axial direction, the terminal line 33a passes through the guide body 61, and is guided so as to be led out to one side in the axial direction of the guide body 61 by the notch 65. The notch 65 includes a first notch 66 and a second notch 67. In the present embodiment, the guide body 61 includes two first notches 66 and six second notches 67.

Figure 7:
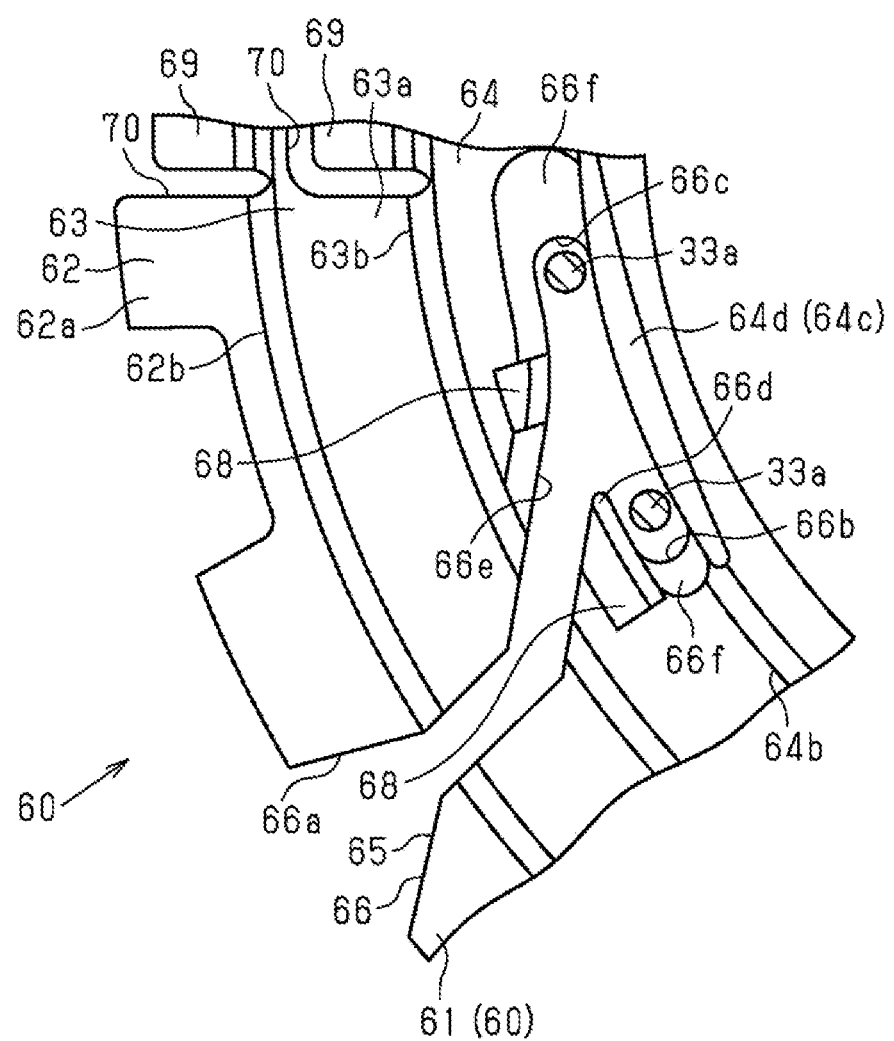
FIG. 7 is a plan view showing a part of the guide member in the embodiment.

As shown in FIG. 7, the first notch 66 is configured to draw in two terminal lines 33a of the coil 33. The second notch 67 is configured to draw in one terminal line 33a of the coil 33.

Figure 11:
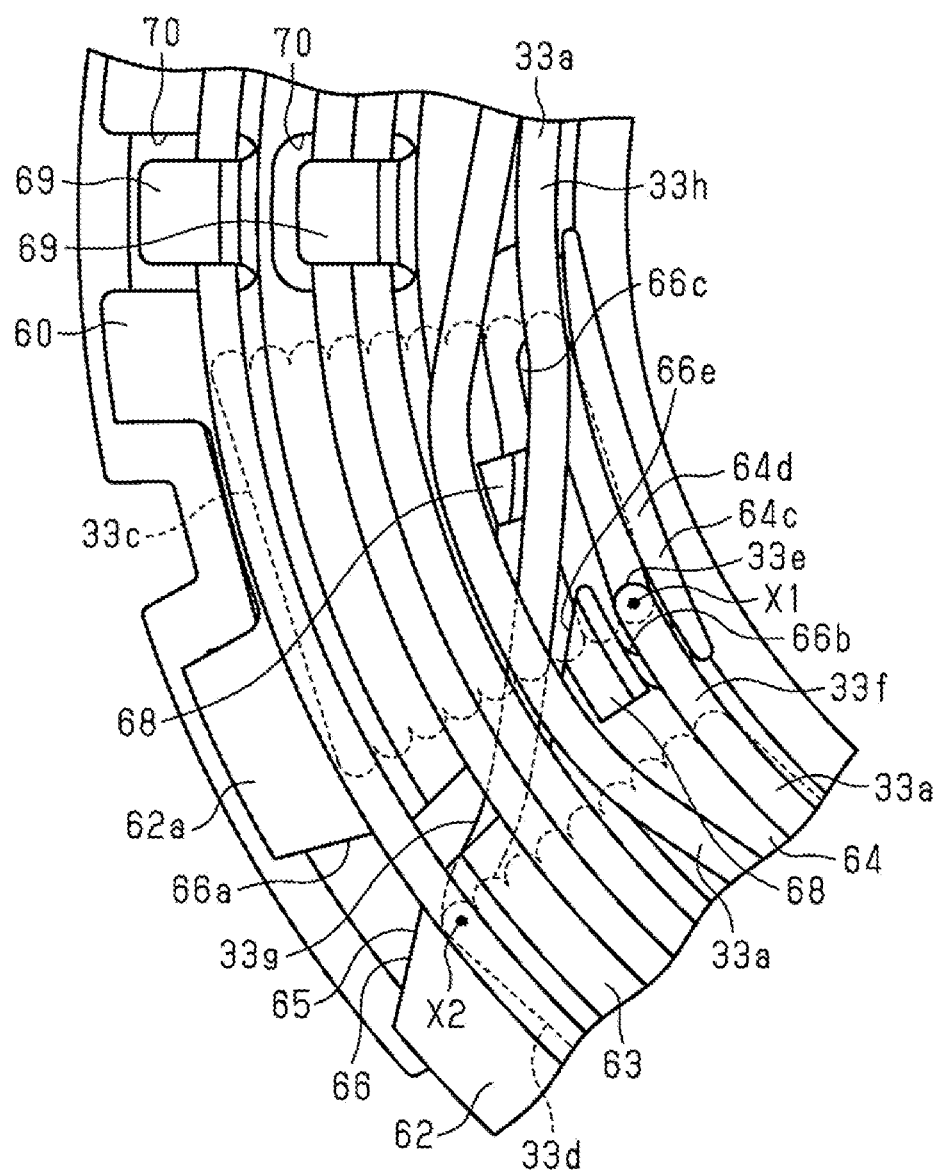
FIG. 11 is a plan view showing a part of the stator in the embodiment.

As shown in FIG. 7 and FIG. 11, each first notch 66 has a guide part 66a and first and second holding parts 66b, 66c. The guide part 66a has a shape that is cut out so as to extend radially inward from the outer end in the radial direction of the guide body 61. The first and second holding parts 66b, 66c have a shape that is cut out so as to extend in the circumferential direction while communicating with the guide part 66a, and hold the terminal line 33a of the coil 33.

The guide part 66a, which corresponds to a radial cutout part, has a shape that is expanded toward the radially outer side at the bottom part 62a of the lower step portion 62. Thereby, it is easy to guide the terminal line 33a of the coil 33. Moreover, the guide part 66a has the inclination guide part 66e that is inclined toward the circumferential direction other side while being extending to radially inner side from radially outer side.

The first holding part 66b, which corresponds to a circumferential cutout part, communicates with the guide part 66a on the radially inner side of the guide part 66a and extends to one side in the circumferential direction. The second holding part 66c communicates with the guide part 66a on the radially inner side of the guide part 66a and is cut out so as to extend to the other side in the circumferential direction. That is, the first holding part 66b and the second holding part 66c are cut out so as to extend in opposite directions in the circumferential direction.

In addition, the guide body 61 has a circumferential projection part 66d formed between the inclination guide part 66e and the first holding part 66b and extending in the circumferential direction. The circumferential projection part 66d suppresses the interference with the terminal line 33a wired in the first holding part 66b by mistake, when the terminal line 33a arranged in the second holding part 66c is pulled in.

Further, as shown in FIG. 11, the first notch 66 is provided in a position that is routed in the circumferential direction so that the terminal lines 33a of the coils 33 adjacent in the circumferential direction intersect.

Specifically, the coil 33 at a position corresponding to the first notch 66 includes a first coil 33c and a second coil 33d adjacent to one side in the circumferential direction. In the present embodiment, the V-phase winding 41d and the U-phase winding 41b correspond to the first coil 33c, and the Y-phase winding 51d and the X-phase winding 51b correspond to the second coil 33d.

The terminal line 33a of the first coil 33c includes a first axial extension part 33e led out from the first coil 33c to one side in the axial direction of the guide member 60, and a first routing part 33f routed from a tip end part of the first axial extension part 33e to one side in the circumferential direction by the guide member 60.

The terminal line 33a of the second coil 33d includes a second axial extension part 33g led out from the second coil 33d to one side in the axial direction of the guide member 60, and a second routing part 33h routed from the tip end part of the second axial extension part 33g to the other side in the circumferential direction by the guide member 60.

A position X1, which is a base end of the first axial extension part 33e, and a position X2, which is a base end of the second axial extension part 33g, are set to the positions where are different in the radial direction. Specifically, the position X1, which is a base end of the first axial extension part 33e, is a position which corresponds to the inner end part in the radial direction of the first coil 33c and a position overlapping the first holding part 66b in the axial direction. That is, the position X1 is set to be located directly below the first holding part 66b. A position X2, which is a base end of the second axial extension part 33g is a position which corresponds to the outer end part in the radial direction of the second coil 33d. The first axial extension part 33e extends substantially straight in the axial direction so as to be disposed in the first holding part 66b, and is led out to the one end side in the axial direction of the guide member 60. Further, the second axial extension part 33g extends along the inclination guide part 66e and extends obliquely in the axial direction so as to be disposed in the second holding part 66c, and is led out to one side in the axial direction of the guide member 60.

As shown in FIG. 6, the second notch 67 has a guide part 67a and a holding part 67b. The guide part 67a has a shape that is cut out so as to extend radially inward from the outer end in the radial direction of the guide body 61, and the holding part 67b has a shape that is cut out so as to extend in the circumferential direction while communicating with the guide part 67a, and holds the terminal line 33a of the coil 33.

The guide part 67a, which corresponds to a radial cutout part, extends toward the radially outer side at the bottom part 62a of the lower step portion 62, similar to the first notch 66. Thereby, it is easy to guide the terminal line 33a of the coil 33.

The holding part 67b, which corresponds to a circumferential cutout part, communicates with the guide part 67a on the radially inner side of the guide part 67a and extends to one side in the circumferential direction or the other side in the circumferential direction.

Figure 22:
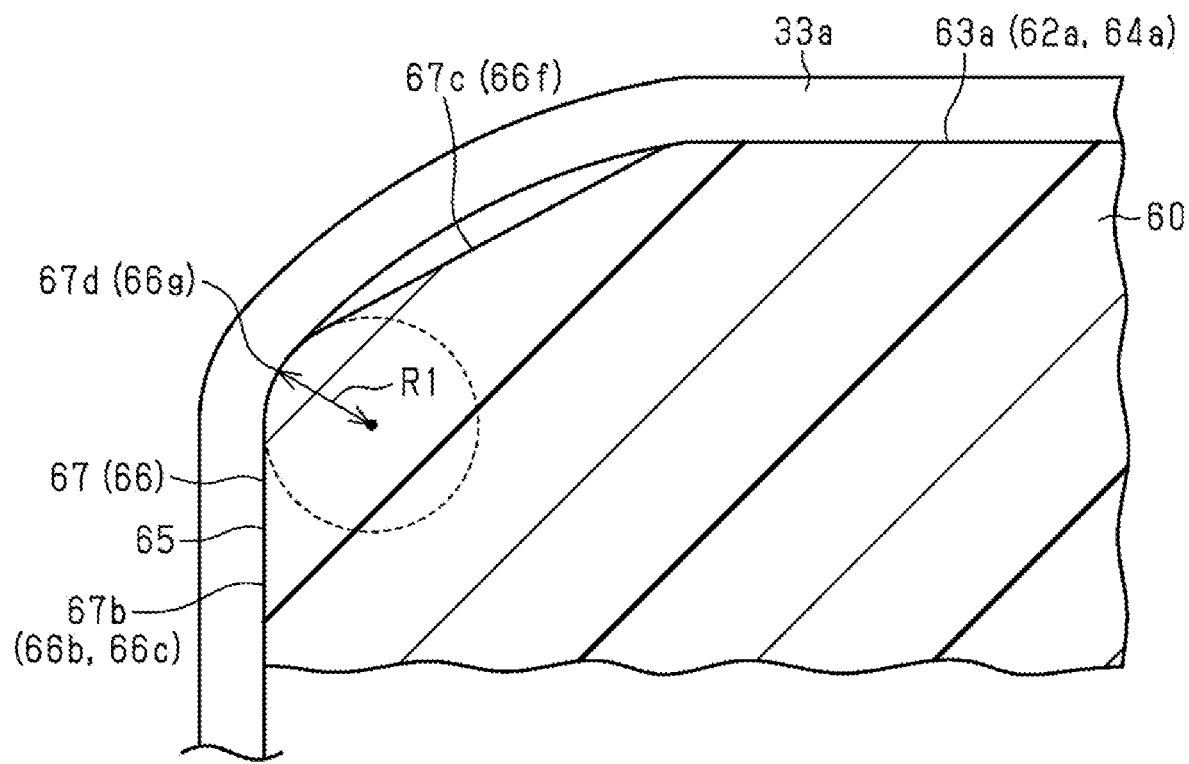
FIG. 22 is a sectional view showing a part of the guide member in the embodiment.

Further, as shown in FIG. 22, the first holding part 66b and the second holding part 66c of the first notch 66 and the holding part 67b of the second notch 67 have recessed parts 66f, 67c respectively. Specifically, end surfaces in the circumferential direction of the first holding part 66b, the second holding part 66c, and the holding part 67b and one end surfaces (that is, the bottom parts 62a, 63a, 64a) in the axial direction of the guide member 60 along the direction in which the terminal lines 33a led to one side in the axial direction of the guide member 60 are drawn in the circumferential direction are connected by the recessed parts 66f, 67c having a recessed shape. The recessed parts 66f, 67c have curved surfaces 66g, 67d that are curved from the end surfaces in the circumferential direction of the first holding part 66b, the second holding part 66c, and the holding part 67b. The curved surfaces 66g, 67d have an R shape with a radius R1 that is equal to or larger than the wire diameter (in other words, a diameter) of the terminal line 33a. The terminal lines 33a are led out to one end side in the axial direction of the guide member 60, and at least part of the terminal lines 33a enter into the recessed parts 66f, 67c and are bent along the curved surfaces 66g, 67d, along the bottom parts 62a, 63a, 64a. The terminal lines 33a are routed in the circumferential direction along the bottom parts 62a, 63a, 64a. In FIG. 22, one of the recessed parts 66f, 67c is schematically shown. However, in the present embodiment, a length in the circumferential direction of the recessed parts 66f, 67c is changed depends on the position where the recessed parts 66f, 67c are formed.

Further, partition parts 68 extending in the axial direction are provided at a location around the first notch 66 where the terminal lines 33a having different phases easily interfere with each other at the same step portions 62, 63, 64. In the present example, at the middle step portion 63 and the upper step portion 64, the partition parts 68 extend in the axial direction on the outer side in the radial direction of the first holding part 66b and the second holding part 66c. The partition parts 68 are disposed radially outward from the step parts 63b, 64b so that the partition parts 68 are spaced apart from the respective step parts 63b, 64b by a gap corresponding to the diameter of the terminal line 33a. The terminal line 33a passing through the radially inner side from the partition parts 68 is firstly inserted into the gap and is drawn. Thereafter, the other terminal line 33a is routed radially outward (outside) from the partition parts 68.

As shown in FIG. 5, in the middle step portion 63 and the upper step portion 64 having the first and second holding parts 66b, 66c of the first notch 66, chamfered parts 63d, 64d are formed at the top parts of the step parts 63b, 64b, as well as at the corner parts 63c, 64c located on the inner side in the radial direction of the first notch 66. Here, when the terminal line 33a is drawn along the first notch 66, a tension may be applied toward the inner side in the radial direction. In this case, if the corner parts 63c, 64c are, for example, a right angle, the terminal line 33a is bent starting from the corner parts. Therefore, the terminal line 33a is easily separated in the radial direction from the step parts 63b, 64b. When the terminal line 33a is drawn along the circumferential direction in a state where the terminal line 33a is radially spaced from the step parts 63b, 64b, for example, the terminal line 33a may not be accommodated in the first holding part 66b. Therefore, as described above, by providing the chamfered parts 63d, 64d at the corner parts 63c, 64c as described above, the bending of the terminal line 33a starting from the corner parts 63c, 64c is suppressed so that the terminal line 33a can be suppressed from being separated from the step parts 63b, 64b in the radial direction. Therefore, when the terminal line 33a is drawn along the circumferential direction, for example, the terminal line 33a is easily accommodated in the first holding part 66b.

Figure 12:
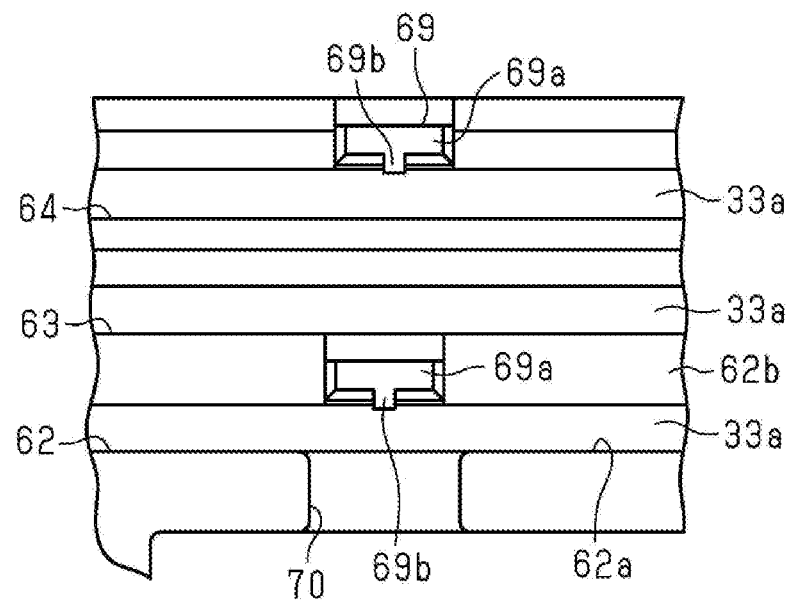
FIG. 12 is a side view showing a part of the stator in the embodiment.
Figure 13:
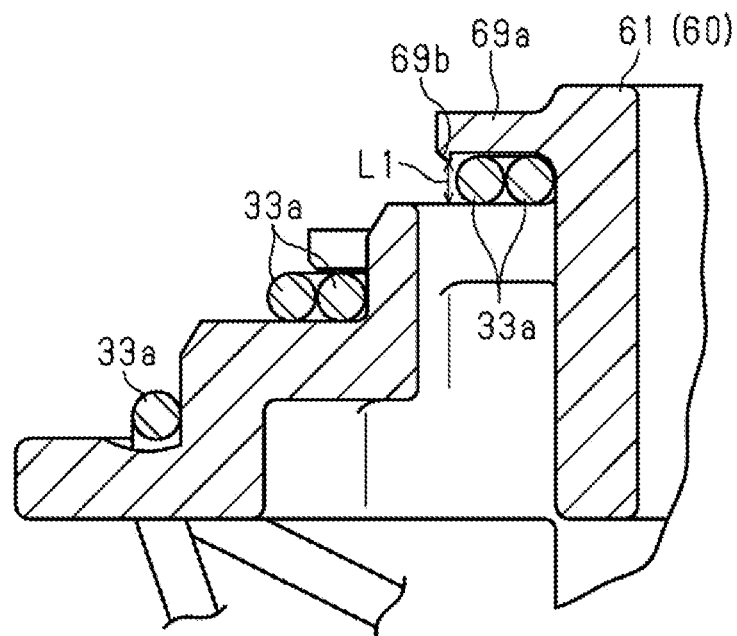
FIG. 13 is a sectional view showing a part of the guide member in the embodiment.

As shown in FIGS. 6, 12, and 13, the guide body 61 is provided with a plurality of terminal line restricting portions 69 that extend in the radial direction from the step parts 62b, 63b, 64b. Five or six terminal line restricting portions 69 of this example are provided in each of the step parts 62b, 63b, 64b. Each terminal line restricting portion 69 has an extending part 69a extending in the radial direction from each step part 62b, 63b, 64b, and a protrusion 69b extending in the axial direction from the distal end side of the extending part 69a. An axial distance L1 from the axial distal end of the protrusion 69b to the bottom parts 62a, 63a, 64a of the step portions 62, 63, 64 is smaller than the wire diameter of the terminal line 33a, so that the terminal line 33a is suppressed from being shifted in the radial direction.

The extending part 69a restricts the terminal line 33a of the coil 33 drawn to the bottom parts 62a, 63a, 64a from moving in the axial direction. In addition, the extending part 69a of the present embodiment has a length in the radial direction that is twice or more the wire diameter of the terminal line 33a so that movement in the axial direction of the two terminal lines 33a arranged in the radial direction can be restricted. The protrusion 69b restricts the terminal line 33a of the coil 33 drawn on the bottom parts 62a, 63a, 64a from moving outward in the radial direction. Thus, the vibration of the terminal line 33a can be suppressed by restricting the movement in the radial direction and in the axial direction of the terminal line 33a. Further, by restricting the movement in the radial direction of the terminal line 33a, the wiring action of the terminal line 33a is facilitated when another terminal line is drawn. That is, it becomes possible to perform wiring easily.

Here, portions of the bottom parts 62a, 63a, 64a opposed to the terminal line restricting portion 69 in the axial direction are cut away, and is defined as a cutaway portions 70. As a result, the terminal line 33a can be temporarily bent toward the cutaway portion 70, so that the clearance between the terminal line restricting portion 69 and the terminal line 33a can be narrowed, for example. The terminal line 33a can be stably held between the bottom parts 62a, 63a, 64a around the cutaway portion 70 and the terminal line restricting portion 69.

Figure 24:
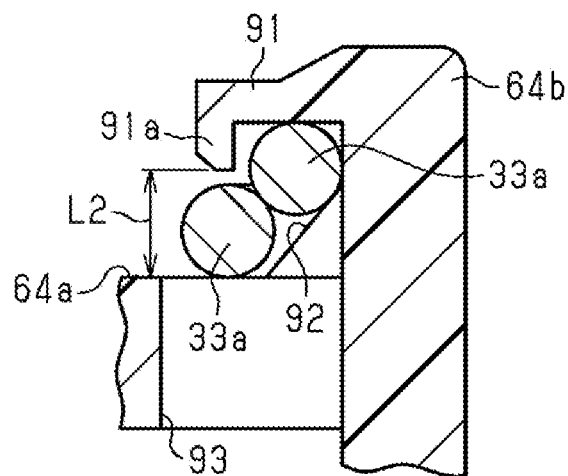
FIG. 24 is a sectional view showing a part of the guide member in the embodiment.

As shown in FIGS. 5, 6, and 24, the guide body 61 is provided with an upper terminal line restricting portion 91, and the upper terminal line restricting portion 91 extends radially outward from a top part on the step part 64b of the upper step portion 64. The upper terminal line restricting portion 91 is provided in a region where the radial length of the bottom part 64a in the upper step portion 64 is smaller, and is provided at a circumferential position that coincides with a circumferential position where the first and second holding parts 66b, 66c of the first notch 66 in the middle step portion 63.

Further, the push-up guide portions 92 are provided at a position shifted in the circumferential direction from the upper terminal line restricting portion 91, and provided on the bottom part 64a on both sides in the circumferential direction of the upper terminal line restricting portion 91, and the axial height of the push-up guide positions 92 gradually increases toward the step part 64b. Thereby, when the terminal line 33a is wired so as to be wound along the step part 64b, the terminal line 33a is lifted in the axial direction from the bottom part 64a by the action of the push-up guide portion 92. Then, the two terminal lines 33a drawn in the circumferential direction on the bottom part 64a of the upper step portion 64 are arranged to shift in the axial direction and the radial direction at the circumferential position corresponding to the upper terminal line restricting portion 91 and the push-up guide portion 92.

Figure 25:
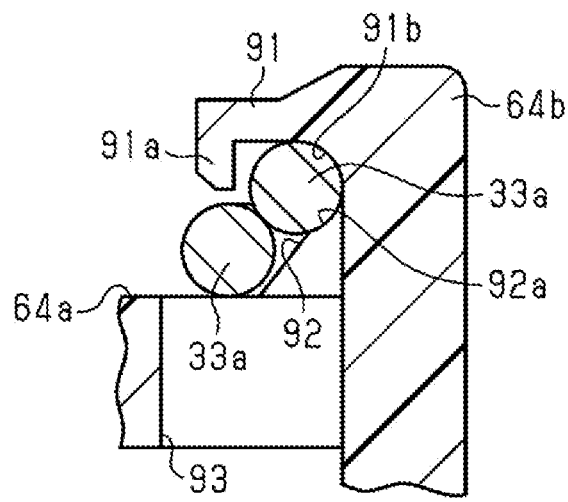
FIG. 25 is a cross-sectional view showing a part of a guide member in another example.

As shown in FIGS. 24, 25, a protrusion 91a protruding toward the bottom part 64a is provided on the radially outer side of the upper terminal line restricting portion 91. A height of the protrusion 91a is set to be 0.5 times or more the wire diameter of the terminal line 33a, and an axial distance L2 from the tip of the protrusion 91a to the bottom part 64a is set to be smaller than 1.5 times of the wire diameter of the terminal line 33a.

Here, portion of the bottom part 64a opposed to the upper terminal line restricting portion 91 in the axial direction are cut away, and is defined as a cutaway portion 93.

As shown in FIGS. 3 to 5, the guide member 60 is provided with a plurality of attachment pieces 71 that extend downward from the lower surface of the bottom part 62a of the lower step portion 62 and are attached to the insulator 32 of the stator core 31.

Figure 23:
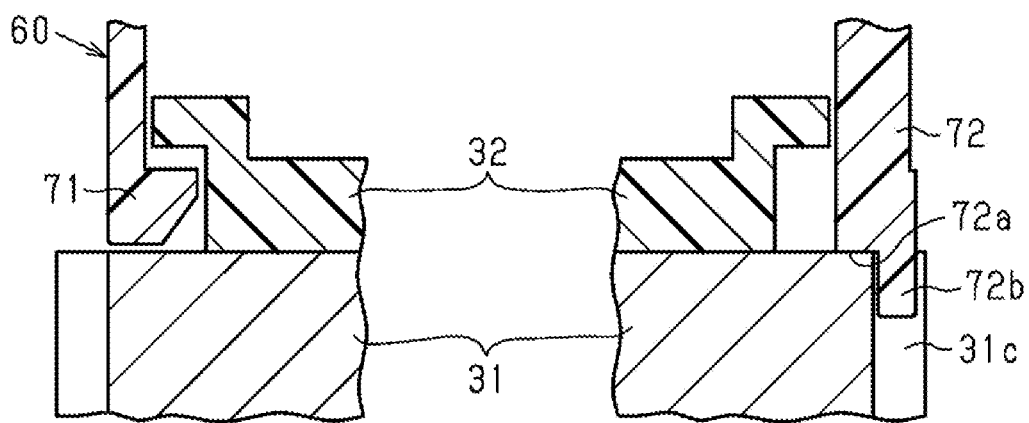
FIG. 23 is a cross-sectional view showing a part of the stator in the embodiment.

As shown in FIG. 23, the attachment piece 71 and the insulator 32 are engaged in the axial direction by a so-called snap-fit structure. In other words, the attachment piece 71 restricts the guide member 60 from moving in the axial direction away from the stator core 31, since a claw of the attachment piece 71 is engaged with the insulator 32. As a result, the guide member 60 is prevented from falling off the stator core 31 (specifically, the insulator 32).

As shown in FIGS. 3 to 5, the guide member 60 has a plurality of leg portions 72. The plurality of leg portions 72 extend downward from a bottom surface of the bottom part 62a of the lower step portion 62, and are capable of contacting the stator core 31 in the axial direction in a state where the guide member 60 is attached to the stator core 31 (specifically, the insulator 32). The leg portions 72 are provided at a position separated from the attachment piece 71 in the circumferential direction.

Specifically, as shown in FIG. 23, the leg portion 72 includes an axial contact part 72a that can axially contact one axial end surface of the stator core 31, and a circumferential contact part 72b that contacts the groove 31c in the circumferential direction. The groove 31c further protrudes in the axial direction adjacent to the axial contact part 72a and is provided on the outer peripheral surface of the stator core 31. The circumferential contact part 72b of the present embodiment protrudes in the axial direction from the center in the circumferential direction of the axial contact part 72a. In other words, it protrudes in the axial direction from between the pair of axial contact parts 72a provided in the circumferential direction. Further, the axial contact part 72a is set so as to contact the one axial end surface of the stator core 31 in a state where the tip of the attachment piece 71 are not in contact with the axial one end surface of the stator core 31. The attachment piece 71 engages with the insulator 32 so as to allow the guide member 60 to move slightly away from the stator core 31 in the axial direction in a state where the axial contact part 72a is in contact with one axial end surface of the stator core 31. That is, the guide member 60 is assembled to the stator core 31 so as to be movable in a slight fixed range in the axial direction. In other words, the guide member 60 and the stator core 31 are assembled so as to be relatively movable within a certain range in the axial direction, that is, assembled with a slight backlash. The guide member 60 is restrained from moving in the axial direction by the terminal line 33a wired in a state assembled to the stator core 31 mainly contacting the curved surfaces 66g, 67d, therefore shaking with respect to the stator core 31 is suppressed. That is, when the terminal line 33a led to one axial direction of the guide member 60 is drawn in the circumferential direction, the terminal line 33a mainly pushes the curved surfaces 66g, 67d, so that the guide member 60 is pressed toward the stator core 31, and the axial contact part 72a is in contact with the stator core 31. Further, shaking of the guide member 60 with respect to the stator core 31 is suppressed by the terminal line 33a which is plastically deformed mainly along the curved surfaces 66g, 67d.

Figure 9:
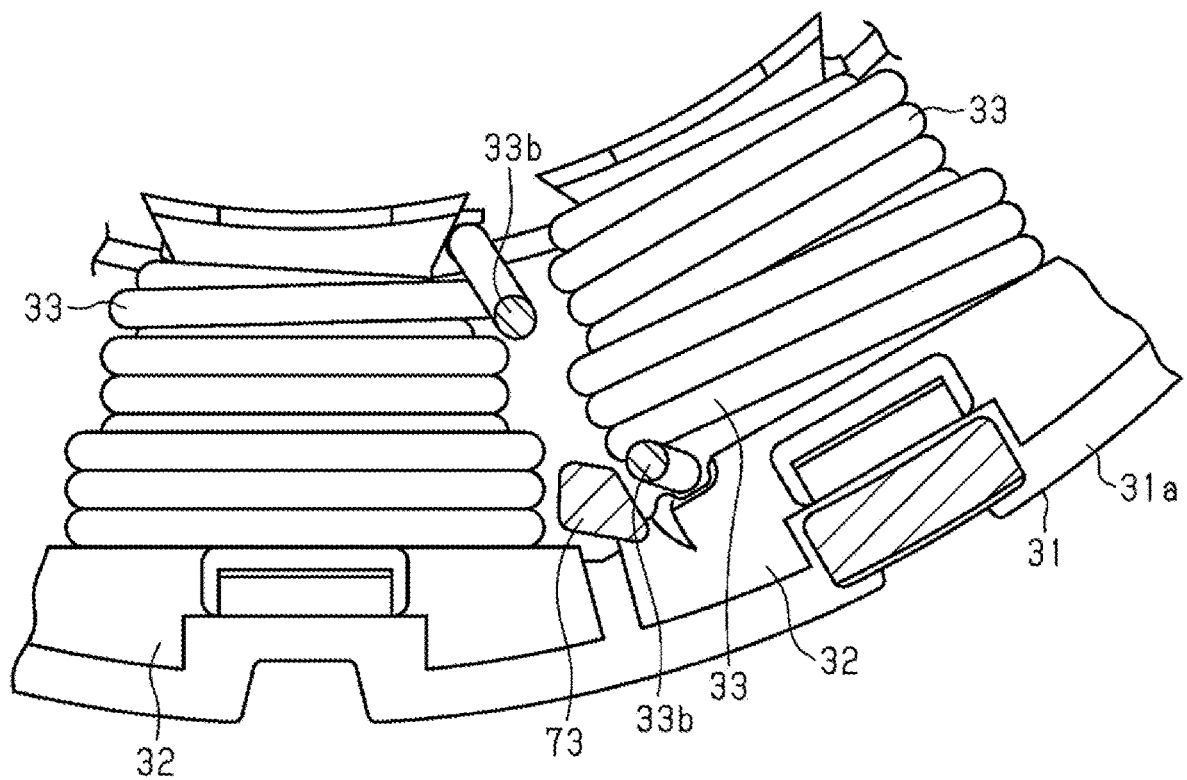
FIG. 9 is a plan view showing a part of the stator in the embodiment.

As shown in FIGS. 3 and 9, the guide member 60 has a convex restricting portion 73 extending toward the stator core 31 in the axial direction. The restricting portion 73 extends from the lower surface of the bottom part 62a of the lower step portion 62 to the stator core 31 side. As shown in FIG. 9, when the guide member 60 is attached to the stator core 31, the restricting portion 73, the insulator 32, and the coil 33 surround the periphery of the axially extending part 33b in the terminal line 33a of the coil 33. This restricts the movement of the axially extending part 33b. A front end in the axial direction of the restricting portion 73 is disposed between the coils 33 adjacent in the circumferential direction and has a tapered shape along the inclination of the coil end.

Figure 8:
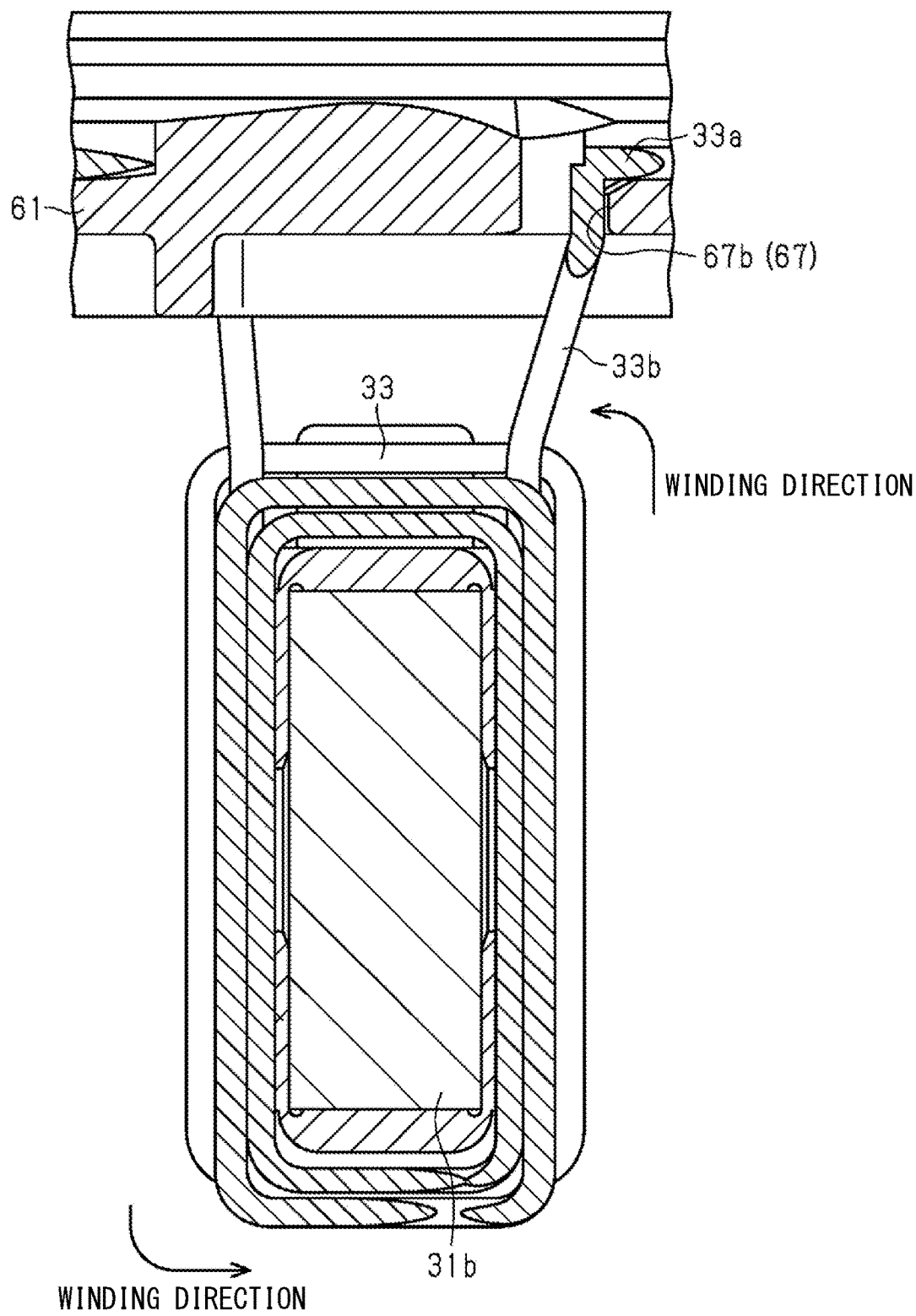
FIG. 8 is a cross-sectional view showing a part of the stator in the embodiment.

As shown in FIG. 8, when the drawing direction in the circumferential direction of the terminal line 33a of the coil 33 is a direction in which the winding of the coil 33 around the stator core 31 is loosened, the holding part 67b, which is a circumferential end portion on the radially inner side of the second notch 67, is provided on the axially extending part 33b. Thereby, even when the terminal line 33a is drawn in the circumferential direction, the winding of the coil 33 is suppressed from being loosened.

Figure 10:
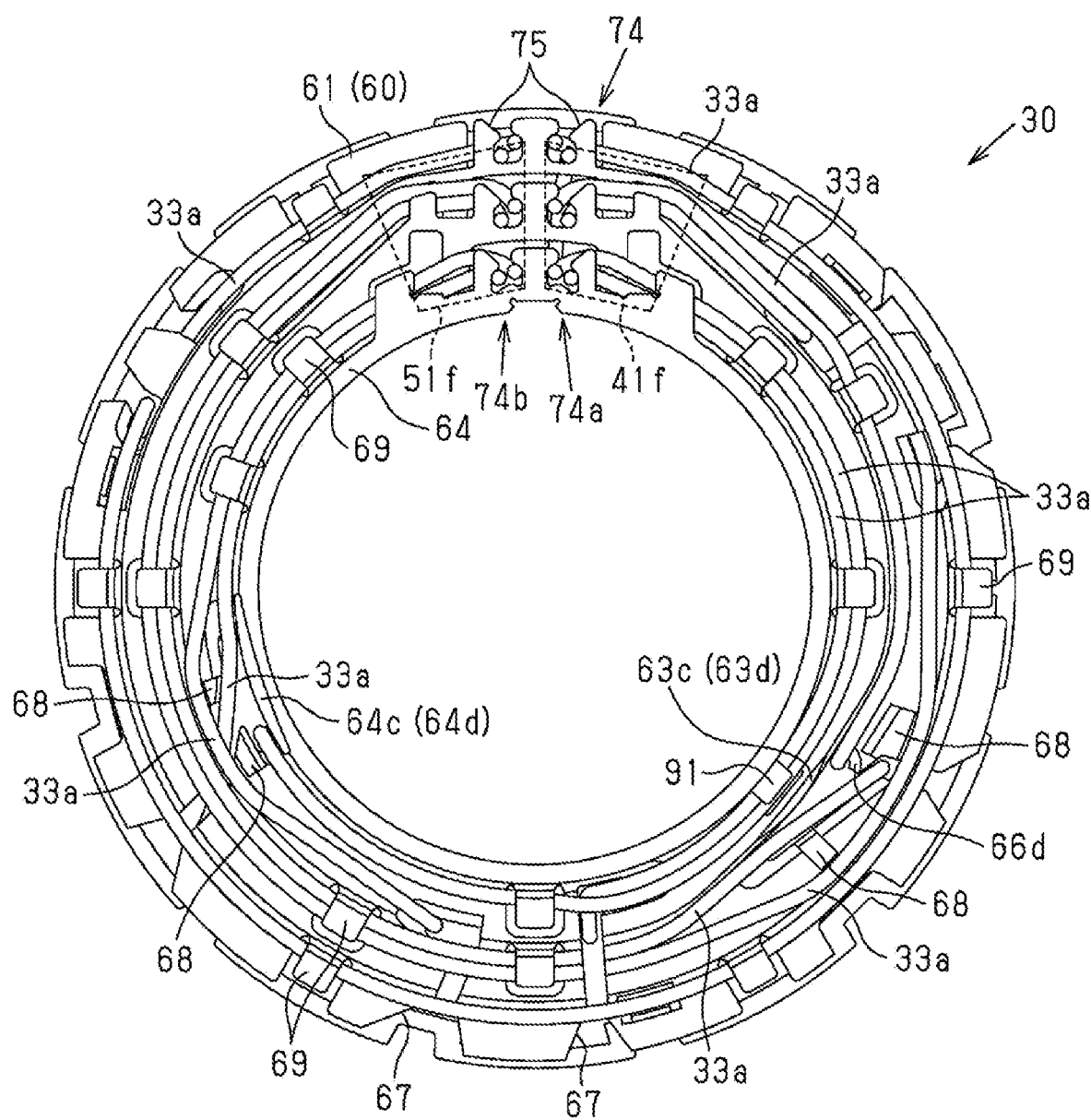
FIG. 10 is a plan view of the stator in the embodiment.
Figure 14:
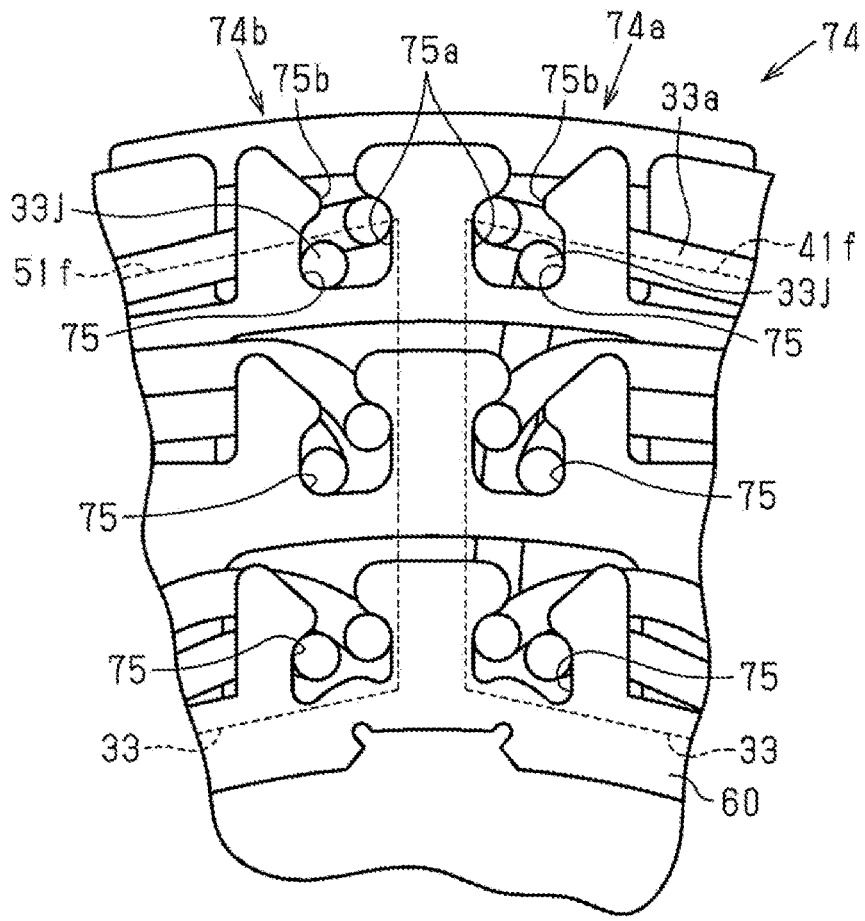
FIG. 14 is a plan view showing a part of the stator in the embodiment.

As shown in FIGS. 6, 10, and 14, the guide body 61 includes a collecting portion 74 that collects the terminal lines 33a at one place in the circumferential direction. The collecting portion 74 collects the coils 33 of different systems at one place in the circumferential direction, namely collects all the terminal lines 33a of the first three-phase winding 40 of one system connected to the first inverter circuit 12a and all terminal lines 33a of the second three-phase winding 50 of the other system connected to the second inverter circuit 12b at one place in the circumferential direction.

Further, as shown in FIG. 14, the collecting portion 74 includes a first collecting part 74a that collects the terminal lines 33a of one system, and a second collecting part 74b that collects a terminal line 33a of the other system adjacent to the first collecting part 74a in the circumferential direction.

The first collecting part 74a and the second collecting part 74b are provided on each of the step portions 62, 63, 64 and are located in a line with the radial direction. The collecting portion 74 includes loose fitting portion 75 that holds the terminal lines 33a drawn on the step portions 62, 63, 64 as a collecting holding part. That is, two loose fitting portions 75 are provided in each of the step portions 62, 63, 64. Six loose fitting portions 75 are provided in total. The loose fitting portions 75 extend radially outward from the step parts 62b, 63b, 64b of the step portions 62, 63, 64. The loose fitting portions 75 include introduction parts 75b that penetrate in the axial direction and open radially outward, and lead-out holding parts 75a that communicate with the introduction part 75b and hold the terminal line 33a while being led out to one side in the axial direction.

The lead-out holding part 75a has a shape that has an opening area larger than the wire diameter of the terminal line 33a and opens in the axial direction. In one example, the lead-out holding part 75a has an open width that is more than two times greater than the diameter of the terminal line 33a. In one example, the lead-out holding part 75a has an open area that is more than two times greater than a cross-sectional area of the terminal line 33a. The introduction parts 75b are located at a radially outer side of the lead-out holding part 75a, and have an opening that is smaller than the wire diameter of the terminal line 33a and open in the radial direction. The terminal line 33a can be introduced into the lead-out holding part 75a from the radially outer side by the introduction part 75b. Further, two terminal lines 33a in the lead-out holding part 75a are in a loose fitting state even if two terminal lines 33a are introduced in the loose fitting portions 75. Thereby, since excessive tension is not applied to the terminal line 33a, damage to the terminal line 33a is suppressed.

Figure 15:
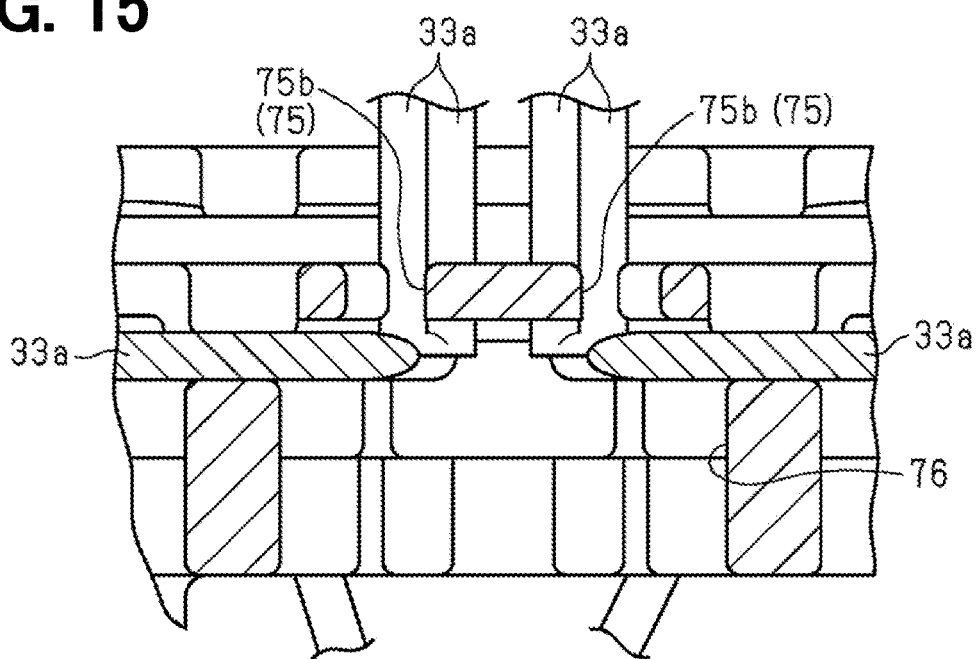
FIG. 15 is a cross-sectional view showing a part of the stator in the embodiment.

As shown in FIG. 15, a cutaway portion 76 is formed on the bottom part which is opposite to the loose fitting portion 75 in the axial direction. As a result, when the terminal line 33a is pulled out and raised in the axial direction, the terminal line 33a is allowed to bend toward the cutaway portion 76. Thus, the terminal line 33a is upwardly drawn from the loose fitting portion 75 along the axial direction.

Here, the terminal lines 33a drawn on the bottom part 62a of the lower step portion 62 are connected to the U terminal of the first inverter circuit 12a and the X terminal of the second inverter circuit 12b. Further, the terminal lines 33a drawn on the bottom part 63a of the middle step portion 63 are connected to the V terminal of the first inverter circuit 12a and the Y terminal of the second inverter circuit 12b. Further, the terminal lines 33a drawn on the bottom part 64a of the upper step portion 64 are connected to the W terminal of the first inverter circuit 12a and the Z terminal of the second inverter circuit 12b.

Then, the terminal line 33a of one system is drawn in a circumferential direction that does not pass through the second collecting part 74b (in a counterclockwise direction in FIGS. 2 and 10) and is collected in the first collecting part 74a. The terminal line 33a of the other system is drawn in the circumferential direction that does not pass through the first collecting part 74a (in a clockwise direction in FIGS. 2 and 10) and is collected in the second collecting part 74b.

Further, the terminal line 33a of the coil 33 arranged in the vicinity of the collecting portion 74 in the terminal line 33a is a non-drawn terminal wire 33j that is collected in the collecting portion 74 without being drawn on the guide member 60 in the circumferential direction. In the present embodiment, the terminal line 33a of the W-phase winding 41f and the Z-phase winding 51f of the coil 33 arranged closest to the collecting portion 74 is a non-drawn terminal wire 33j. As described above, the W-phase winding 41f and the Z-phase winding 51f are the coils 33 connected by the jumper wires 41j, 51j longer than the other jumper wires 41g, 41h, 51g, 51h, respectively. Further, the non-drawn terminal wire 33j is held on the radially outer side of the loose fitting portion 75. Further, a center in the circumferential direction of the first collecting part 74a and the second collecting part 74b is coincide with a center in the circumferential direction of the W-phase winding 41f and the Z-phase winding 51f. The pair of non-drawn terminal wires 33j are respectively held on the side close to the circumferential direction in the loose fitting portion 75. The non-drawn terminal wire 33j is not routed in the circumferential direction on one end side in the axial direction of the guide member 60, and extends to the loose fitting portion 75 on the radially outer side on the other axial end side of the guide member 60 so as to be led out from the loose fitting portion 75 to one side in the axial direction and be held.

As shown in FIGS. 16A to 16D and FIG. 17, the pullout guide 81 is configured to have a long column shape in the axial direction. The pullout guide 81 has six through holes 82 respectively corresponding to the six loose fitting portions 75 when the pullout guide 81 is attached to the guide body 61.

Each through hole 82 is configured to be opposite to the respective loose fitting portion 75 in the axial direction, when the pullout guide 81 is attached to the guide body 61. Each through hole 82 is formed along a longitudinal direction (that is, the axial direction) of the pullout guide 81.

The pullout guide 81 is made of, for example, an insulating material such as a resin. Therefore, the terminal line 33a inserted into the through hole 82 of the pullout guide 81 is insulated from the other terminal line 33a inserted into the other through hole 82. Further, the housing 11a of the hydro unit 11 and the terminal line 33a inserted through each through hole 82 are insulated.

As shown in FIGS. 16A to 16D and FIG. 17, in each through hole 82, an opening area of an inlet port 82a located on the stator core 31 side is larger than an opening area of an outlet port 82b located on the side opposite to the stator core 31. Each through hole 82 has an opening area that gradually decreases from the inlet port 82a side to the outlet port 82b side. An inner peripheral surface of the through hole 82 has a curved surface shape.

Figure 16A:
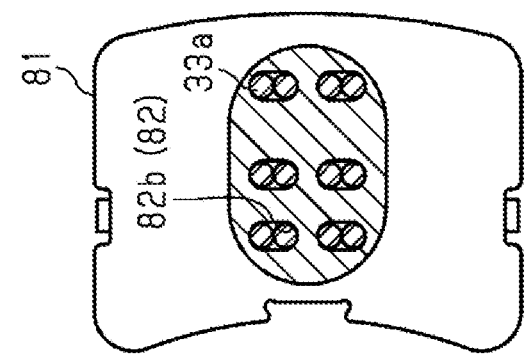
FIG. 16A to FIG. 16D are cross-sectional views of guides for pulling out guide members in the embodiment.
Figure 16B:
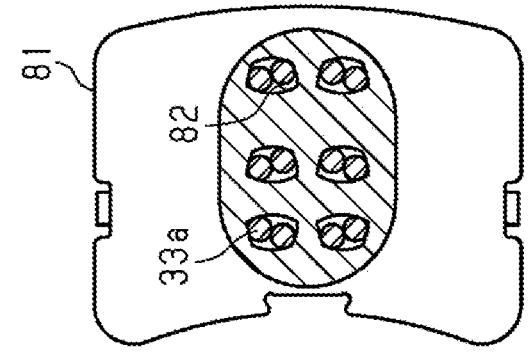
Figure 16C:
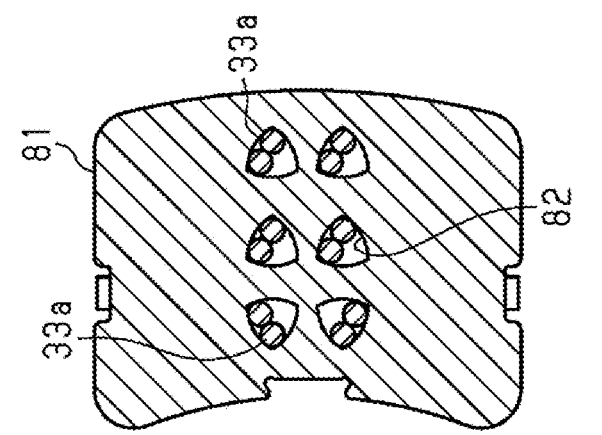
Figure 16D:
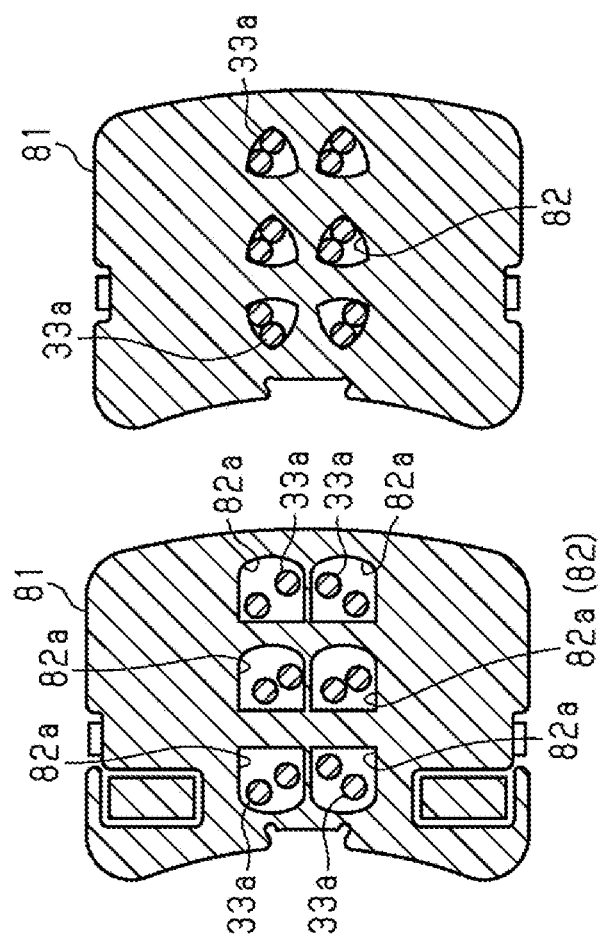
Figure 17:
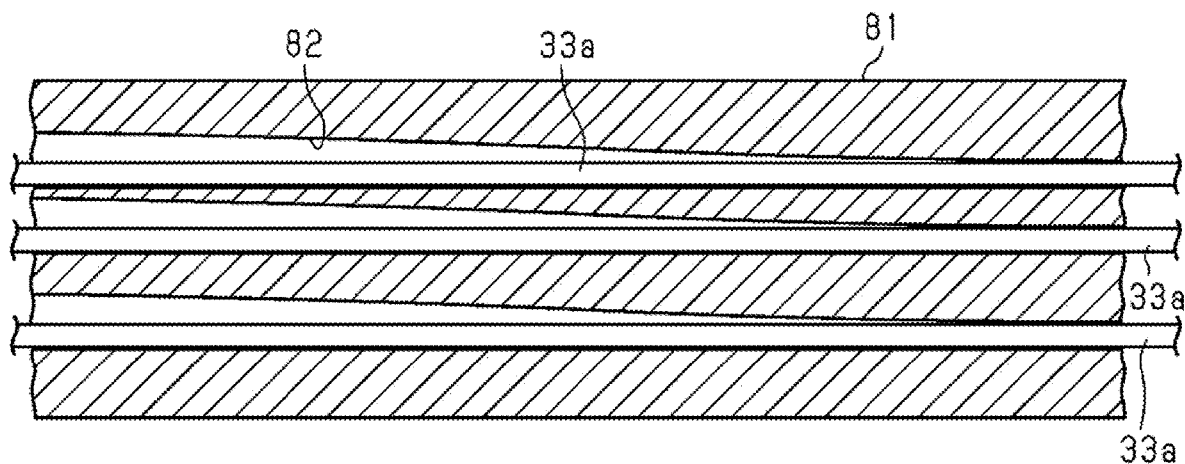
FIG. 17 is a cross-sectional view of the guide for pulling out a guide member in the embodiment.

As shown in FIG. 16A, the through holes 82 have a substantially quadrangular opening shape at positions close to the inlet port 82a. As shown in FIG. 16D, the through hole 82 has an oval shape at positions close to the outlet port 82b. As shown in FIG. 16B, the opening shape of the through hole 82 is a constant-width triangular shape at a midway position between the inlet port 82a and the outlet port 82b. Such a structure allows the through hole 82 to guide the terminal line 33a so that the plurality terminal lines 33a inserted in the through hole 82 are arranged in a predetermined direction. Further, in a configuration having a constant-width triangular shape (so-called Reuleaux triangular shape) in the intermediate position of the through hole 82, for example, when the width of the triangular shape may corresponds to two of the wire diameter of the terminal line 33a, the two terminal lines 33a may be moved at that position, and the position of the terminal line 33a may be adjusted.

Further, since the opening area of the through hole 82 at positions close to the inlet port 82a is sufficiently larger than the wire width of each terminal line 33a, each terminal line 33a is in a non-fixed state. Here, the resonance frequency decreases as the non-fixed length of the terminal line 33a increases. The resonance frequency may be increased, when the through holes 82 have a constant cross-sectional area in a predetermined range from the outlet port 82b.

Next, a method for manufacturing the stator of the present embodiment will be described.

Figure 18:
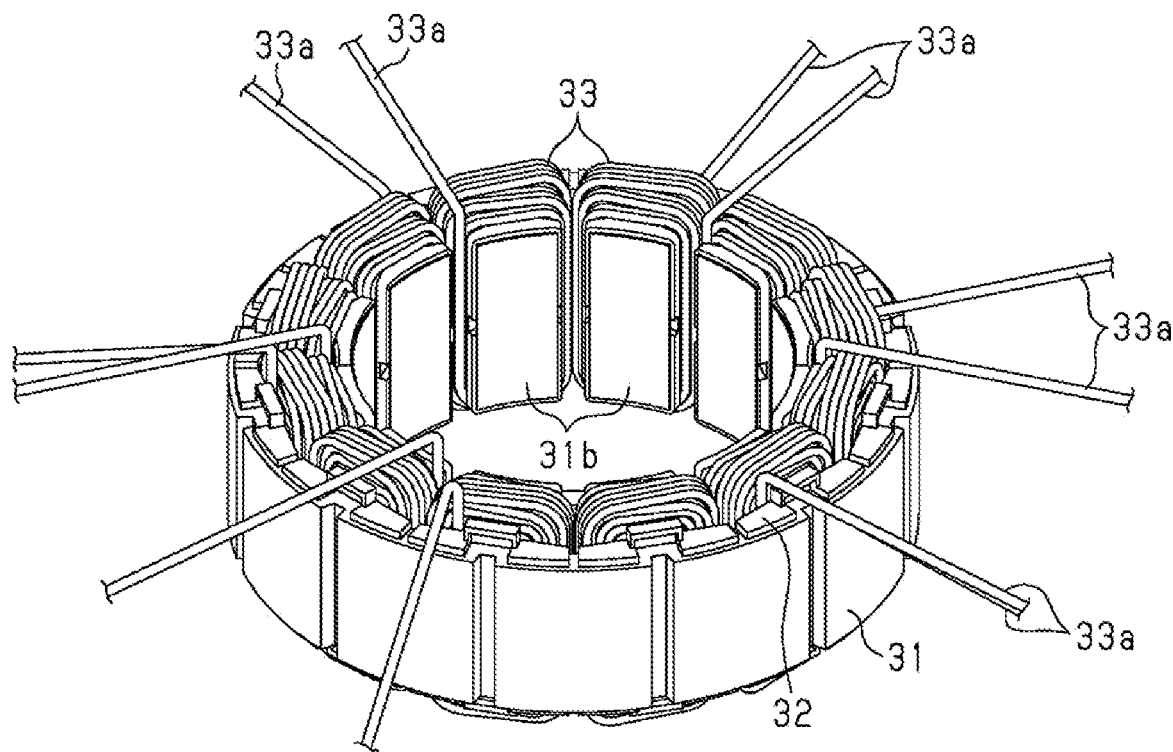
FIG. 18 is an explanatory diagram for explaining a manufacturing method for the stator in the embodiment.

As shown in FIG. 18, the coils 33 are wound around the teeth 31b of the stator core 31.

Next, as shown in FIG. 18, a bending step is performed in which the terminal lines 33a of the coil 33 wound around the teeth 31b of the stator core 31 are pulled out in the axial direction and bent in the radial direction.

Figure 19:
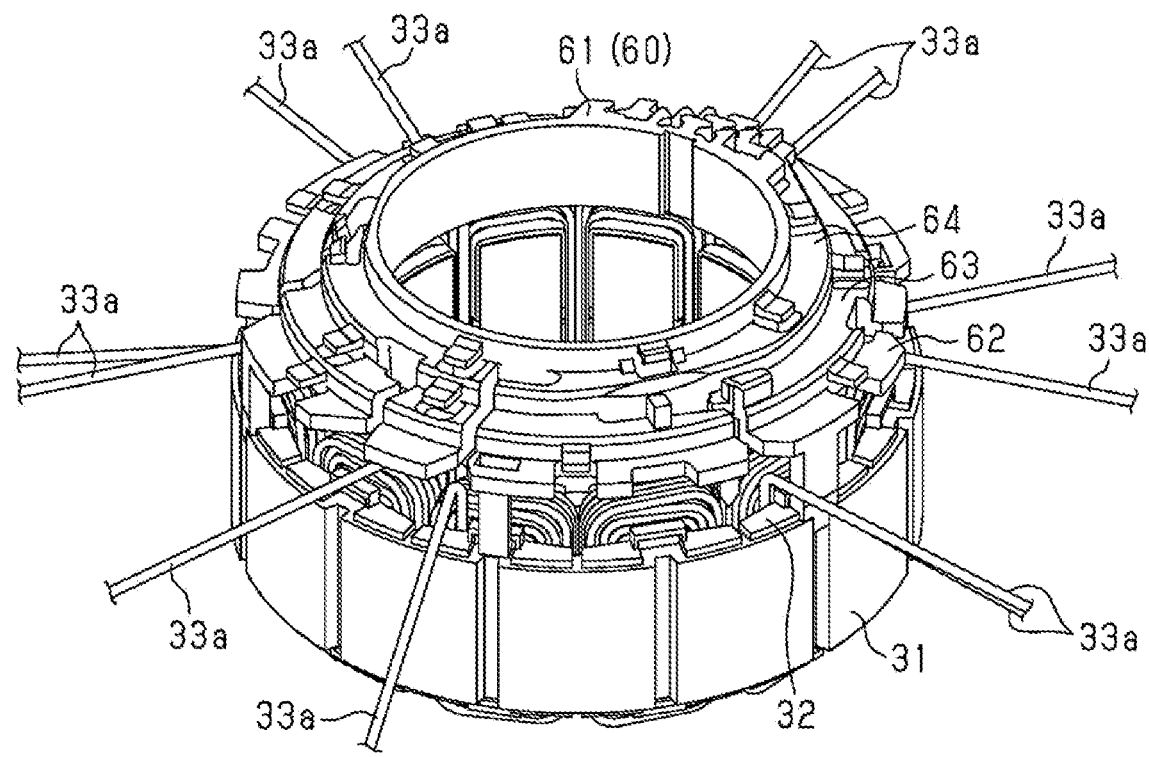
FIG. 19 is an explanatory diagram for explaining a manufacturing method for the stator in the embodiment.

Next, as shown in FIG. 19, an assembling step is performed in which the guide body 61 of the guide member 60 is assembled on the one end side in the axial direction of the stator core 31. At this time, since each terminal line 33a is bent in the radial direction in the bending step, interference of the guide member 60 with the terminal line 33a is suppressed.

Figure 20:
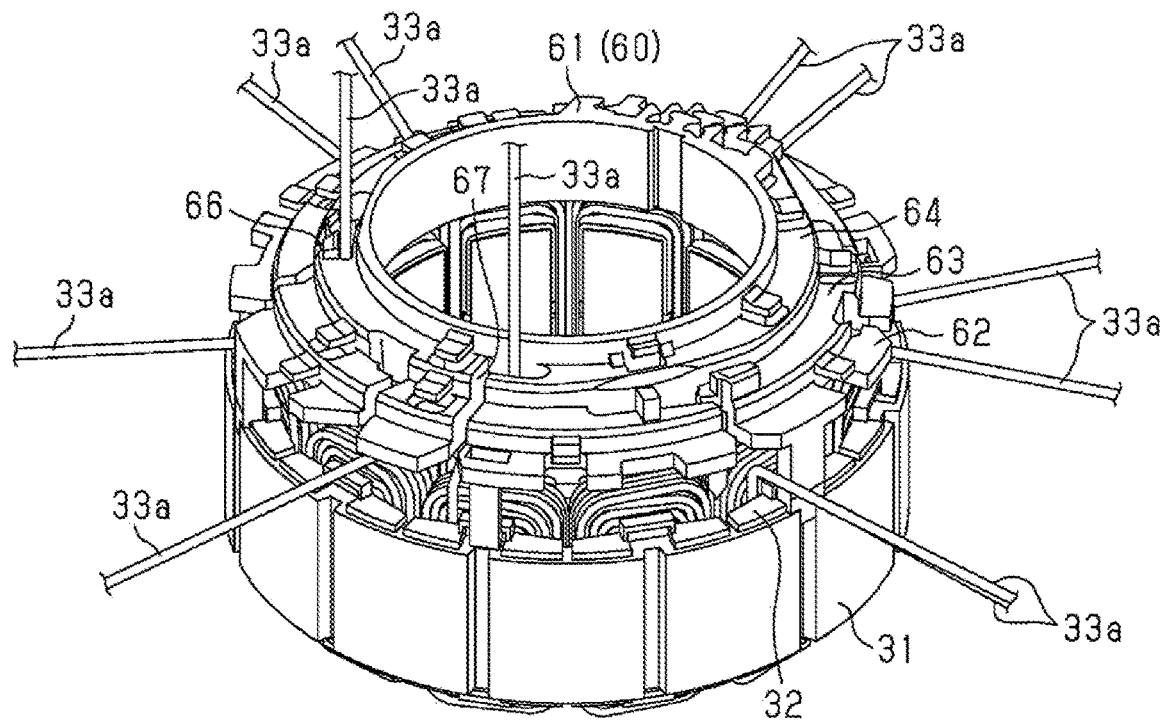
FIG. 20 is an explanatory diagram for explaining a manufacturing method for the stator in the embodiment.

Next, as shown in FIG. 20, the terminal lines 33a are bent in the axial direction, and a drawing process is performed in which the terminal lines 33a are drawn in the corresponding first and second notches 66 and 67.

Figure 21:
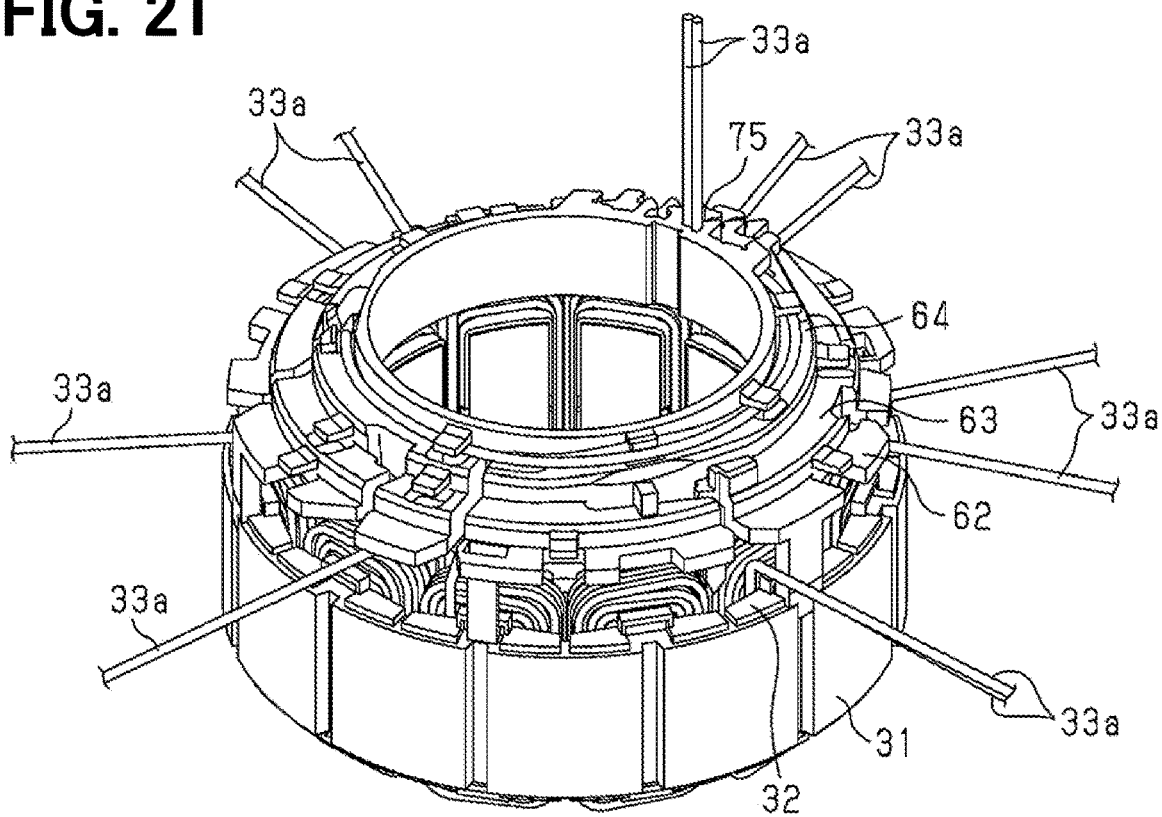
FIG. 21 is an explanatory diagram for explaining a manufacturing method for the stator in the embodiment.

Next, as shown in FIG. 21, a wiring step is performed in which the terminal lines 33a are drawn in the circumferential direction, and thereafter a pulling-out step is performed in which the terminal line 33a is drawn toward one side in the axial direction while holding the terminal lines 33a in the loose fitting portion 75. The drawing-in step, the wiring step, and the pulling-out step are repeatedly performed for each of the terminal lines 33a. In the present example, the wiring step is repeatedly performed on the terminal lines 33a in order from the one that is wired on the radially inner side (upper step portion 64 side). For the non-drawn terminal wire 33j, only the pulling-out step is performed without performing the drawing-in step and the wiring step.

Thereafter, the pullout guide 81 is passed through the through hole 11b provided in the housing 11a of the hydro unit 11 in a state where the terminal lines 33a held in each loose fitting portion 75 are inserted in the through hole 82 of the pullout guide 81. Furthermore, the terminal lines 33a are electrically connected to the first inverter circuit 12a or the second inverter circuit 12b provided on the circuit board in the EDU 12.

The effects of the present embodiment will be described.

(1) The guide member 60 is disposed on one side in the axial direction of the stator core 31, and guides the terminal lines 33a of the coil 33 in the circumferential direction at a position overlapping the coil 33 in the axial direction. Therefore, the increase in the radial direction may be easily suppressed as compared with the configuration where the terminal lines 33a of the coil 33 are drawn outside in the radial direction of the coil 33. The guide member 60 has the collecting portion 74 which collect the terminal lines 33a at one place in the circumferential direction. The terminal line 33a of the coil 33 (specifically, the W-phase winding 41f and the Z-phase winding 51f) arranged in the vicinity of the collecting portion 74 in the terminal line is a non-drawn terminal wire 33j that is collected in the collecting portion 74 without being drawn on the guide member 60 in the circumferential direction. Therefore, for example, the number of terminal lines 33a drawn in the circumferential direction on the guide member 60 can be reduced as compared with a case where all terminal lines are drawn in the circumferential direction on the guide member 60. Therefore, for example, the radial range in which the terminal lines 33a on the guide member 60 are arranged can be reduced. In addition, for example, the number of notches 65 for leading the terminal lines 33a to one side in the axial direction of the guide member 60 can be reduced, and the shape of the guide member 60 can be simplified.

(2) The end of the coil 33 opposite to the terminal line 33a is connected to each phase by the jumper wires 41g, 41h, 41j, 51g, 51h, 51j. The coils 33 (specifically, the W-phase winding 41f and the Z-phase winding 51f) provided with the non-drawn terminal wire 33j are connected to each other by the jumper wire 41j, 51j which are longer than the other jumper wires 41g, 41h, 51g, 51h. Therefore, the difference in the total length of the coil 33, the terminal line 33a, and the jumper wires 41g, 41h, 41j, 51g, 51h, 51j for each coil 33 can be reduced. Therefore, it is possible to suppress variations in characteristics based on the different lengths.

(3) Since the jumper wires 41g, 41h, 41j, 51g, 51h, 51j are arranged on the other axial end side of the stator core 31, for example, when assembling the guide member 60 arranged on one axial side of the stator core 31 The jumper wires 41g, 41h, 41j, 51g, 51h, 51j are prevented from interfering.

(4) The collecting portion 74 has a plurality of loose fitting portions 75 in the radial direction for holding the terminal wires 33a, and the non-drawn terminal wires 33j are held by the loose fitting portions 75 on the radially outer side. Therefore, it can be easily collected without interfering with other terminal lines 33a in the collecting portion 74.

(5) In the collecting portion 74, a center in the circumferential direction of the first collecting part 74a and the second collecting part 74b is coincide with a center in the circumferential direction of the W-phase winding 41f and the Z-phase winding 51f. The terminal wires 33a of the W-phase winding 41f and the Z-phase winding 51f are non-drawn terminal wires 33j and are respectively held by the loose fitting portions 75 on the side close to the circumferential direction. Therefore, by arranging the terminal lines 33a in a well-balanced manner, for example, the number of terminal lines 33a drawn in the circumferential direction on the guide member 60 is reduced as compared with a configuration in which only one non-drawn terminal wire 33j is provided.

The above-described embodiments may be modified as follows. The above-described embodiments and the following modifications can be implemented in combination with one another as long as there is no technical contradiction.

In the above embodiment, the push-up guide portion 92 has a shape in which the axial height gradually increases at a constant rate toward the step part 64b. However, it is only necessary that the terminal line 33a is wound along the step part 64b and the terminal lines 33a are lifted from the bottom part 64a in the axial direction.

For example, as shown in FIG. 25, the push-up curved surface part 92a that makes surface contact with the outer periphery of the terminal lines 33a may be formed on a top part of the push-up guide portion 92. According to the above configuration, the terminal line 33a surface-contacts with the push-up curved surface part 92a, and the shakiness of the terminal line 33a may be eliminated and the terminal line 33a may be held stably.

In the example shown in FIG. 25, the upper terminal line restricting portion 91 has an upper curved surface part 91b that is in surface contact with the outer periphery of the terminal line 33a. According to the above configuration, the terminal line 33a surface-contacts with the upper curved surface part 91*b*, and the shakiness of the terminal line 33*a* may be eliminated and terminal line 33*a* may be held stably.

The end surfaces in the circumferential direction at the inner end in the radial direction of the notch 65, and the one end surface (that is, bottom parts 62*a*, 63*a*, 64*a*) in the axial direction of the guide member 60 along the direction in which the terminal line 33*a* led to one side in the axial direction of the guide member 60 is drawn in the circumferential direction are connected by the recessed parts 66*f*, 67*c* having a recessed shape. However, the recessed parts 66*f*, 67*c* may be omitted.

In the above embodiment, the recessed parts 66*f*, 67*c* have the curved surfaces 66*g*, 67*d* that are curved from the circumferential end surface at the radially inner end of the notch 65. However, the present embodiment is not limited to this configuration. The recessed parts 66*f*, 67*c* without having the curved surfaces 66*g*, 67*d* may be available.

In the above embodiment, the curved surfaces 66*g*, 67*d* have an R shape with the radius R1 equal to or larger than the wire diameter of the terminal line 33*a*. However, the present embodiment is not limited to this configuration. The curved surfaces 66*g*, 67*d* may have an R shape with the radius less than the wire diameter of the terminal line 33*a*.

In the above embodiment, the guide member 60 is prevented from moving in the axial direction by the contact of the terminal line 33*a* with the curved surfaces 66*g*, 67*d*. However, the guide member 60 is not limited to this configuration. The shakiness of the axial direction of the guide member 60 with respect to the stator core 31 may be suppressed by using another structure or another member, for example.

In the above embodiment, the guide member 60 includes the circumferential contact part 72*b* that protrudes in the axial direction adjacent to the axial contact part 72*a* and contacts the groove 31*c* provided in the stator core 31 in the circumferential direction. However, the guide member is not limited to this configuration. The guide member may be positioned in the circumferential direction with another configuration without having the circumferential contact part 72*b*.

In the above embodiment, the guide member 60 includes the attachment piece 71 having a snap-fit structure that restricts movement in a direction away in the axial direction from the stator core 31 at a position separated from the axial contact part 72*a*. However, the guide member is not limited to this configuration. The guide member 60 may be assembled to the stator core 31 by using another structure.

In the above embodiment, the coil 33 has a coil 33 of a different system (specifically, the first three-phase winding 40 and the second three-phase winding 50) connected to the circuit of the different system (specifically, the first and second inverter circuits 12*a* and 12*b*). However, the coil is not limited to this configuration. The stator 30 may have only a coil connected to a circuit in a single system. In this configuration, of course, the collecting portion 74 collects only the terminal lines 33*a* in the single system.

In the above embodiment, the collecting portion 74 includes a first collecting part 74*a* that collects the terminal lines 33*a* of one system, and a second collecting part 74*b* that collects a terminal line 33*a* of the other system adjacent to the first collecting part 74*a* in the circumferential direction. However, the collecting portion is not limited to this configuration. For example, the terminal line 33*a* of one system and the terminal line 33*a* of the other system may be collected in the first collecting part 74*a*. Further, for example, the terminal line 33*a* of one system and the terminal line 33*a* of the other system may be collected in the second collecting part 74*b*.

In the above embodiment, the terminal line 33*a* of one system is drawn in the circumferential direction that does not pass through the second collecting part 74*b* and is collected in the first collecting part 74*a*, and the terminal line 33*a* of the other system is drawn in the circumferential direction that does not pass through the first collecting part 74*a* and is collected in the second collecting part 74*b*. The terminal line 33*a* of one system and the terminal line 33*a* of the other system are not limited to this configuration. At least one terminal line 33*a* may be drawn in the reverse direction.

In the above embodiment, the first collecting part 74*a* and the second collecting part 74 of the collecting portion 74 include the loose fitting portions 75 that hold the terminal lines 33*a* drawn on each of the step portions as a collecting holding part. The first collecting part 74*a* and the second collecting part 74 are not limited to this configuration. The collecting portion 74 may hold the terminal lines 33*a* without being drawn on the step portion.

In the above embodiment, the loose fitting portion 75 as the collecting holding part includes the introduction parts 75*b* that penetrate in the axial direction and open radially outward, and the lead-out holding parts 75*a* that communicate with the introduction part 75*b* and hold the terminal line 33*a* while being led out to one side in the axial direction. The loose fitting portion 75 is not limited to this configuration. The collecting holding part with another structure may be used as long as the terminal lines 33*a* can be held. For example, although the loose fitting portion 75 hold the terminal lines 33*a* in a loose fitting state, the collecting holding part may hold the terminal lines 33*a* in a non-loose fitting state.

The position X1, which is a base end of the first axial extension part 33*e* in the terminal line 33*a* of the first coil 33*c*, and the position X2, which is a base end of the second axial extension part 33*g* in the terminal line 33*a* of the second coil 33*d*, are set to the positions where are different in the radial direction. The positions X1 and X2 are not limited to this configuration. The positions X1 and X2 may be set to the positions where are same in the radial direction.

In the above embodiment, the guide part 66*a* has the inclination guide part 66*e* that is inclined toward the circumferential direction other side while being extending to radially inner side from radially outer side. The guide part 66*a* is not limited to this configuration. The guide part 66*a* may be formed so as to not to incline in the circumferential direction as a whole.

In the above embodiment, the partition parts 68 extend in the axial direction on the outer side in the radial direction of the first holding part 66*b* and the second holding part 66*c*. The partition parts 68 are not to this configuration. The partition parts 68 may be provided only on the radially outer side of either one of the first holding part 66*b* and the second holding part 66*c*, or the partition part 68 may be omitted.

In the above embodiment, the position X1, which is a base end of the first axial extension part 33*e*, is a position which corresponds to the inner end part in the radial direction of the first coil 33*c*, and the position X2, which is a base end of the second axial extension part 33*g* is a position which corresponds to the outer end part in the radial direction of the second coil 33*d*. The positions X1 and X2 are not limited to this configuration. The positions X1 and X2 may be different positions in the radial direction which correspond to the end part in the radial direction.

In the above embodiment, the coils 33 (specifically, the W-phase winding 41f and the Z-phase winding 51f) provided with the non-drawn terminal wire 33j are connected to each other by the jumper wire 41j, 51j which are longer than the other jumper wires 41g, 41h, 51g, 51h. The coils are connected to each other by the jumper wire having the same length.

In the above embodiment, the jumper wires 41g, 41h, 41j, 51g, 51h, 51j are arranged on the other axial end side opposite to the side on which the guide member 60 of the stator core 31 is arranged. The jumper wires are not limited to this configuration. The jumper wires may be are arranged on the one axial end side to the side on which the guide member 60 of the stator core 31 is arrange.

In the above embodiment, the non-drawn terminal wire 33j is held on the radially outer side of the loose fitting portion 75. The non-drawn terminal wire 33j is not limited to this configuration. For example, the non-drawn terminal wire 33j may be held on the radially inner side of the loose fitting portion 75.

In the above embodiment, the center in the circumferential direction of the first collecting part 74a and the second collecting part 74b in the collecting portion 74 is coincide with the center in the circumferential direction of the W-phase winding 41f and the Z-phase winding 51f. However, the center in the circumferential direction of the first collecting part 74a and the second collecting part 74b may not be coincide with the center in the circumferential direction of the W-phase winding 41f and the Z-phase winding 51f. Moreover, in the above embodiment, the terminal line 33a of the coil 33 arranged in the vicinity of the collecting portion 74 in the terminal line 33a is the non-drawn terminal wire 33j. The non-drawn terminal wire 33j is not limited to this configuration. The terminal line 33a of the coil 33 disposed in the vicinity of the collecting portion 74 to the extend that it can be collected to the collecting portion 74 without being drawn in the circumferential direction by the guide member 60 may be the non-drawn terminal wire 33j.

In the above embodiment, a part of the plurality of terminal lines 33a drawn in the circumferential direction on the bottom part 64a is shifted in the axial direction and the radial direction. However, all of the plurality of terminal lines 33a drawn in the circumferential direction on the bottom part 64a may be shifted not in the axial direction, but in the radial direction.

In the above embodiment, the push-up guide portion 92 is provided on the step part 64b and has a shape in which the axial height gradually increases toward the step part 64b. However, the push-up guide portion 92 may be omitted.

In the above embodiment, the guide member 60 has the upper terminal line restricting portion 91 which extends radially outward from a top part on the step part 64b of the upper step part 64b so as to restrict the movement of the terminal line 33a in the axial direction. However, the upper terminal line restricting portion 91 may be omitted.

In the above embodiment, the protrusion 91a protruding toward the bottom part 64a is provided on the radially outer side of the upper terminal line restricting portion 91. However, the protrusion 91a may be omitted. Further, the protrusion amount of the protrusion 91a and the axial distance L2 from the tip of the protrusion 91a to the bottom part 64a may be changed.

In the above embodiment, the push-up guide portions 92 are provided at a position shifted in the circumferential direction from the upper terminal line restricting portion 91. However, the push-up guide portions 92 and the upper terminal line restricting portion 91 may be provided at a position that coincides in the circumferential direction, in other words, a position that overlaps with each other in the axial direction.

In the above embodiment, the guide body 61 of the guide member 60 has the lower step portion 62, the middle step portion 63, and the upper step portion 64 as a plurality of step portions to form a three-step staircase. However, for example, the guide body may have two step portions. For example, the guide body may have no step portion, namely, the structure in which each terminal line 33a is drawn in the circumferential direction on the single plane of the guide member. In addition, in the structure without step portion, it is preferable to provide a wall part at a position where the step parts 62b, 63b, 64b in the above embodiment.

In the above embodiment, the first notch 66 has the first and second holding parts 66b, 66c that are notched from the radially inner side of the guide part 66a to both sides in the circumferential direction. However, any one of the first and second holding parts 66b, 66c may be omitted, that is, the second notch 67 may be used instead of the first notch 66, for example. When the second notch 67 is used in place of the first notch 66, the two second notches 67 are provided to the one first notch 66, so that substantially the same function is obtained.

In the above embodiment, the terminal line restricting portion 69 is provided. However, the terminal line restricting portion 69 may be omitted.

In the above embodiment, the drawing-in step, the wiring step, and the pulling-out step are repeated and carried out in order from the terminal line 33a drawn in the radial inner side (upper step portion 64 side). However, for example, at least one of the terminal line 33a is drawn on radially outer side, and then the terminal line 33a is wired on radially inner side.

However, in the assumable stator, the grooves are provided on the insulator, and a portion where the grooves are formed is limited to the outer side in the radial direction than a portion around which the windings are wound. Therefore, this may increase the size in the radial direction of the stator including the insulator.

The present disclosure is made to solve the above-described problems, and an object of the present disclosure is to provide the stator that can suppress an increase in the radial direction.

In the stator (30), coils (33) of multiple phases are wound around a stator core (31) via an insulator (32). A guide member (60) is provided on one side of the stator core in an axial direction and guides a terminal line (33a) of the coil in a circumferential direction at a position overlapping the coil in the axial direction. The guide member has a collecting portion (74) which collect the terminal lines at one place in the circumferential direction. The terminal line 33a of a coil (41f, 51f) arranged in the vicinity of the collecting portion in the terminal line is a non-drawn terminal wire (33j) that is collected in the collecting portion without being drawn on the guide member in the circumferential direction.

According to this configuration, the guide member is disposed on one side in the axial direction of the stator core, and guides the terminal lines of the coil in the circumferential direction at a position overlapping the coil in the axial direction. Therefore, the increase in the radial direction may be easily suppressed as compared with the configuration where the terminal lines of the coil are drawn outside in the radial direction of the coil. The guide member has a collecting portion which collect the terminal lines at one place in the circumferential direction. The terminal line of the coil arranged in the vicinity of the collecting portion in the terminal line is a non-drawn terminal wire that is collected in the collecting portion without being drawn on the guide member in the circumferential direction. Therefore, for example, the number of terminal lines drawn in the circumferential direction on the guide member can be reduced as compared with a case where all terminal lines are drawn in the circumferential direction on the guide member. Therefore, for example, the radial range in which the terminal lines on the guide member are arranged can be reduced.

The invention claimed is:

1. A stator comprising:
a stator core;
coils of multiple phases that is wound around the stator core via an insulator, and including a plurality of terminal lines, wherein the coils are three-phase coils that are connected by a delta connection; and
a guide member that is disposed on one side of the stator core in an axial direction, and being configured to guide the plurality of terminal lines of the coils in a circumferential direction at a position overlapping with the coils in the axial direction, wherein
the guide member has a collecting portion which collect the plurality of terminal lines at one place in the circumferential direction,
a terminal line of a respective coil arranged in a vicinity of the collecting portion in the terminal line is a non-drawn terminal wire that is collected in the collecting portion without being drawn on the guide member in the circumferential direction,
an end of each of the coils opposite to a respective terminal line is connected to each phase by jumper wires, and
the coils provided with the non-drawn terminal wire are connected to each other by a jumper wire that is longer than other jumper wires.

2. The stator according to claim 1, wherein
the jumper wire is disposed on an other axial end side of the stator core.

3. The stator according to claim 1, wherein
the collecting portion has a plurality of collecting holding portions in a radial direction so as to hold the terminal line, and
the non-drawn terminal wire is held on a radially outer side of the plurality of collecting holding portions.

4. The stator according to claim 1, wherein
the collecting portion has a pair of collecting holding parts in the circumferential direction,
a circumferential center of the pair of collecting holding parts is coincident with a circumferential center of a pair of coils adjacent in the circumferential direction, and
each of the plurality of terminal lines of the pair of coils is regarded as the non-drawn terminal wire and are held by the pair of collecting holding parts on the side close to the circumferential direction.

* * * * *